Sept. 11, 1956 — F. E. ULLERY — 2,762,198
MEMBER SPACING CONSTRUCTION IN HYDRODYNAMIC TORQUE CONVERTERS
Filed April 18, 1952 — 4 Sheets-Sheet 1

INVENTOR.
Fred E. Ullery

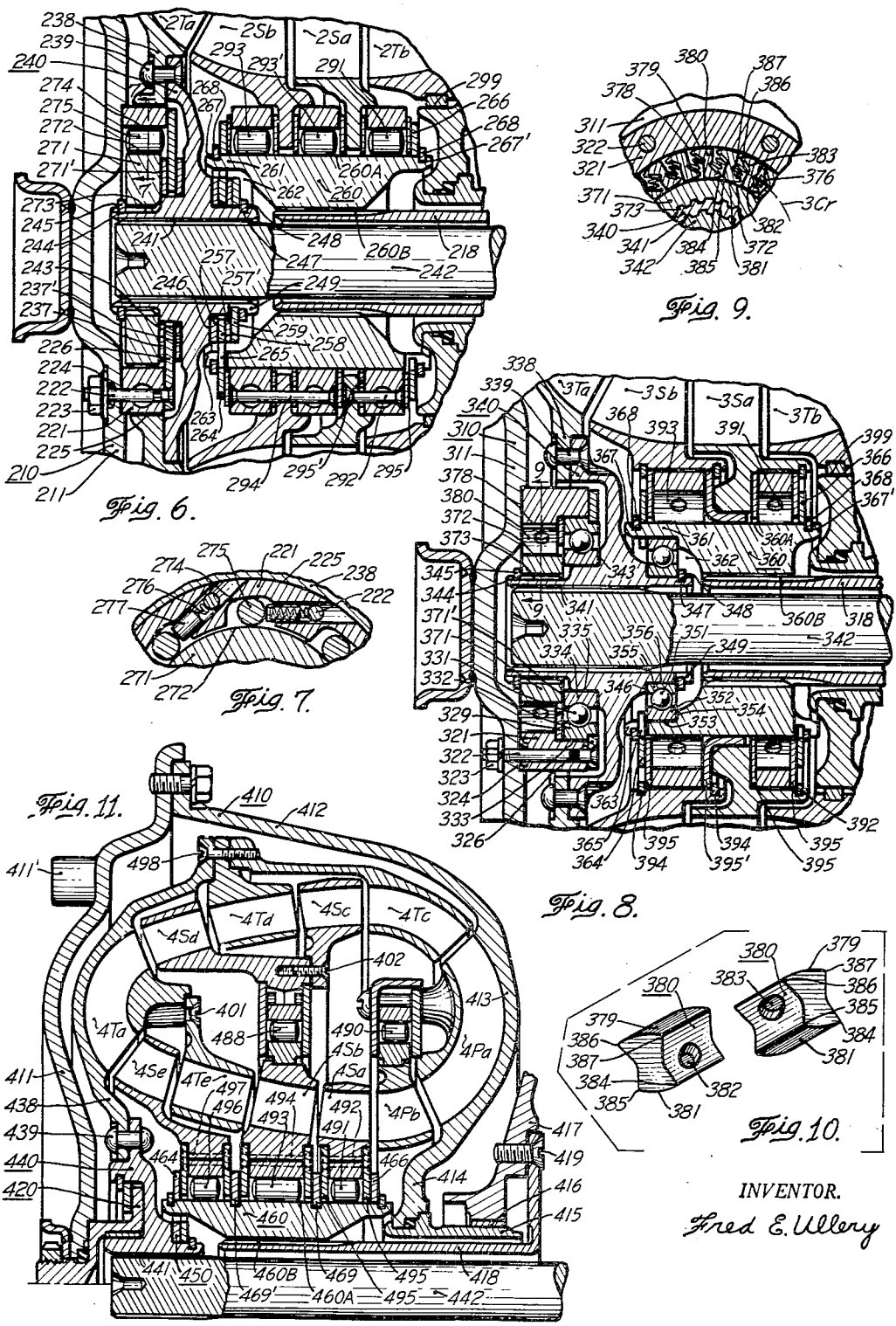

Sept. 11, 1956  F. E. ULLERY  2,762,198
MEMBER SPACING CONSTRUCTION IN
HYDRODYNAMIC TORQUE CONVERTERS
Filed April 18, 1952  4 Sheets-Sheet 3

INVENTOR.
Fred E. Ullery

INVENTOR.
Fred E. Ullery

United States Patent Office 2,762,198
Patented Sept. 11, 1956

2,762,198

MEMBER SPACING CONSTRUCTION IN HYDRODYNAMIC TORQUE CONVERTERS

Fred E. Ullery, Detroit, Mich.

Application April 18, 1952, Serial No. 283,090

41 Claims. (Cl. 60—54)

The invention of this application relates to a novel spacing combination in a hydrodynamic torque converter having a rotatory casing enclosing pump, turbine, and stator, bladed members, whereby the rotatory casing and the members are maintained in spaced relationship with each other. The basic combination axially locates relative to the rotatory casing, a particular turbine hub relative to which at least one turbine member is, and preferably all the turbine members are, axially situated; and axially locates relative to that turbine hub, a particular stator hub relative to which at least one stator member is, and preferably all the stator members are, axially situated; but, permits axial freedom with the torque converter output shaft in order to avoid inadvertant or unintentional thrust from an external association thereof to either the rotatory casing, the turbine hub, or the stator hub. The specific construction for axially spacing the pump, or the pump members, is not included; usually, a pump member is either an integral part of the rotatory casing, or has a specific construction to axially situate it therewith.

This specification also includes a construction to axially locate a stator hub relative to the turbine hub, as well as a particular retentive construction with the stator hub to axially situate one or more stator members therewith.

This specification also contemplates the combination whereby the turbine hub is not only located axially relative to the rotatory casing, but is rendered one-way rotatory therewith, the construction preventing forward overrun of the turbine hub relative to the rotatory casing.

This application is a continuation-in-part of my pending applications: Serial No. 238,459, filed July 25, 1951; Serial No. 255,167, filed November 7, 1951; Serial No. 261,702, filed December 14, 1951; and, Serial No. 271,550, filed February 14, 1952. In each of these prior applications, at least one embodiment of this member spacing combination is clearly shown in combination with turbine and stator members of various torque converter combinations.

There is a continuation-in-part application relating to invention which is partially disclosed herein. That application is Serial No. 286,117, filed May 5, 1952.

Also, there are other applications claiming invention undisclosed herein, but using embodiments for settings which partially disclose invention claimed in this application. Those applications are: Serial No. 298,560, filed July 12, 1952; and Serial No. 313,471, filed Oct. 7, 1952.

In this application, unless otherwise stated, the terms used are as recommended and with the meaning as defined in Hydrodynamic Drive Terminology, pages 738–740 of the 1951 SAE Handbook, published by the Society of Automotive Engineers, Inc. Where optional terms are given, the first is considered preferable, and therefore is used in this specification.

As referred to in this specification, a hydrodynamic torque converter physically comprises: a rotary casing enclosing a plurality of co-axial members, including at least, one pump, one turbine, and one stator, each having an array of blades across a portion of a toroidal fluid circuit, and each member being rotatory in at least one phase of operation; and, structural components including, a stationary housing or support structure, an input power structure, an output power shaft or structure, and a reaction torque structure.

The ends of the torque converter and the elements thereof are designated in accordance with the usual coaxial drive arrangement for automobiles, the front end of the torque converter being that adjacent to the engine flywheel, and the back end being that near the appended mechanical transmission. This automotive reference defines the directional relationship of the internal parts relative to the rotatory casing. For other applications, the external components may be arranged differently, particularly when either or both of the input and the output drives are either parallel offset, angular intersecting, or angular offset relative to the torque converter axis.

The term, member, is restricted in this specification to mean a bladed member of a torque converter, such as, a pump member, a turbine member, or a stator member. Normally, a member includes a shell element, a core element, and an array of blades extending between the shell and the core elements.

Forward rotation is the direction of rotation of the pump member or members.

Fluid circuit refers to the toroidal fluid recirculating path. In reference thereof, the outer half and the inner half indicate respectively, the radially outward portion, and the radially inward portion, relative to the average radius of the fluid circuit; the average radius being the average of, the largest design radius and the smallest design radius of the fluid circuit. Accordingly, an outer member has the design radii of its blades larger, and an inner member has the design radii of its blades smaller, than the average radius of the fluid circuit.

As used herein, the terms axially fixed, axially located, and axially situated, are somewhat synonymous, each meaning that the parts, members, or elements, so specified are maintained in definite relationship axially in both directions; of course, within practical limitations, such as, stress and thermal deflections, axial clearance to permit relative rotation, and reasonable manufacturing tolerances of the particular parts and the retaining and/or confining elements.

The different terms are used to indicate the normal structural nature of the particular association, but without imposing the restriction that it can not be otherwise. Axially fixed implies that the pertinent parts or elements are in actual contact. Axially located implies an intervening element or component between the pertinent parts or members; for instance, a stator hub axially located with a turbine hub by means of a double-acting thrust bearing. Axially situated is normally used with regard to stator members and turbine members and their respective hubs, for which the associating structures necessarily vary widely according to relative location and accessibility; a member may be in actual contact or integral with its respective hub, or may have intervening components or structures which may include one or more members of like character.

A double-acting thrust bearing is an axial bearing having thrust and thrust reaction elements, and which is used between specified components or parts: to axially locate in both axial directions, one to the other; to transmit the thrust of one to the other in both axial directions; and, to permit relative rotation of one to the other.

Thrust bearing association is the relationship between two opposing annular surfaces in which one is a thrust surface, the other is a reaction surface, and one is rotatory relative to the other; however, the particular surfaces are not necessarily required to be in actual contact with each other, either or both surfaces may have a surface treatment which may include an overlay, or a thrust washer of bearing material may be interposed between the particular surfaces.

Integral is the term used in this specification to describe a fixed association of an element or a structure relative to another, so that, the resultant structure is unitary, or is practically equivalent to a unitary structure; but it does not necessarily mean that the resultant structure was unitary from its origin. It is used to indicate a resultant structure that may be properly and practically processed intact from its origin, but without imposing the unjust limitation that it can not be otherwise—such a limitation would readily permit circumvention. For instance, a fabrication of stampings could be used in lieu of an unitary casting or an unitary stamping, in fact, such a construction might be more convenient for certain usage or for existing manufacturing facilities.

Some of the principal objects of this invention are to improve the efficiency and to increase the life of hydrodynamic torque converters, by more effectively maintaining the tip spacing of blades of adjacent members and by reducing the thrust bearing loads and losses. As will be subsequently explained, some related members exert large thrusts in opposite directions in phases when they are rotationally unisonant; so, by merging those thrusts together and associating the resultant thrust with the component having the lowest relative speed, the thrust bearing requirements and losses are reduced accordingly.

A related object is to keep the thrusts of the members contained and balanced within the rotary casing to avoid detrimental thrusts between the rotary casing and the stationary supporting structure.

An important object is to axially support the stator and the turbine members in spaced arrangement with each other and with the rotary casing, relative to which each pump member is axially situated; thus maintaining all the members in spaced relationship.

An object which is important for convenient and dependable manufacture is to group members of like character structurally into subassemblies which may be bench assembled or assembled on lines confluent to the final assembly where only a few major subassemblies are then readily joined into a complete torque converter. Also, this construction permits convenient gauge and visual inspection of most of the member spacings before enclosure in the rotary casing.

An object of an embodiment, which is a combination of this spacing construction and a one-way rotary device, is to prevent forward overrun of the output power shaft relative to the input power structure; thus, to obtain greater downhill coasting resistance (engine braking), and to grant push-starting of the engine at a low vehicle speed.

These objects as well as others will be apparent throughout this specification.

Hitherto, many different constructions have been used to axially space turbine and stator members in a rotary casing having at least one pump member in the back end of, and axially situated with, that casing. It is believed that the following constructions indicate and embrace the extent of prior art appertaining to this specification: a construction having, one turbine member axially fixed with an output shaft which is axially located with the stationary housing, and two stator members axially situated with a hollow reaction shaft which is also axially fixed with the stationary housing; an illustration showing, two double-acting ball thrust bearings, one axially locating two turbine members with the rotary casing, the other axially locating in effect two stator members with the turbine members, and having the inner race of each bearing and the turbine hub axially fixed with the torque converter output power shaft; an illustration showing, a one-way device and a double-acting ball type thrust bearing for axially locating and for rendering one-way rotatory a turbine member hub relative to a rotary casing, and another similar bearing for axially locating a stator member hub relative to the turbine hub, the inner race of each bearing, the inner drum of the one-way device, and the turbine hub being axially fixed with the torque converter output shaft; a construction having, a double-acting thrust bearing which axially locates one turbine member with the rotary casing, two stator members axially situated with a stator hub which is interposed, and axially floating, between a thrust reaction surface of the back side of the turbine hub and a thrust reaction surface of the front side of the pump hub, and having the turbine and the stator hubs axially independent of the output power and the reaction shafts; and, the most common construction having a co-axial stack of components, including at least a turbine hub and a stator hub for one or two stator members, interposed, and axially floating, between a thrust reaction surface associated with the front portion of the rotary casing and a thrust reaction surface of the front side of the pump hub, and having the turbine and the stator hubs axially independent of the output power and the reaction shafts.

The basic construction of this invention is superior to any one of those constructions which, as stated, is believed to represent the extent of appurtenant prior art. This superiority will be apparent in the ensuing explanation of the physical circumstances within the rotary casing, and the desirable and most convenient associations with the input power source and the mechanical transmission which is usually appended to the back end of a torque converter.

In a hydrodynamic torque converter having a rotary casing, it is fundamentally desirable to contain and balance all the thrusts of the members within the casing. Singularly, any thrust relationship between a member and an external association causes an equivalent opposing thrust between either the rotary casing, or a component attached thereto, and the stationary supporting structure. Furthermore, if transmitted through either the stator or the turbine members, the external thrust may increase the thrust bearing loads of those members relative to the rotary casing.

For automotive applications, it is general practice to rotationally unite and to axially join the engine crankshaft and flywheel, and the rotary casing together; also, to balance all of the thrusts of the members within the rotary casing, and to have the turbine and the stator members axially independent of the output and the reaction shafts to avoid inadvertent and unintentional thrusts through those shafts which would cause offsetting thrusts on the thrust bearings of the engine crankshaft.

There are other important reasons for having the torque converter output and the reaction shafts axially independent of the turbine and the stator members. A torque converter usually has at its output end a mechanical transmission fixed with the stationary supporting structure to provide a reverse gear, supplementary gear ratios if needed, and a hydraulic system serving the torque converter as well as the transmission, the torque converter output shaft being the input shaft for the transmission, and ordinarily, the reaction shaft is most conveniently connected to a stationary part of that transmission. It is inadvisable and unnecessary to axially fix the torque converter members and transmission elements at the opposite ends of the torque converter output shaft; the axial dimension from a torque converter member to any particular element in the transmission varies considerably due to, the manufacturing tolerances required for the many separate parts of the connecting structure, stress and thermal deformations of those parts, etc.

The axial location of the torque converter output shaft relative to the torque converter is usually less important than to the transmission. In the torque converter, it is practical to permit considerable variation in the axial relationship of a turbine hub to the output shaft, and in that of a stator hub to the reaction shaft; and, the respective rotational connections may be conveniently achieved with axial slip joint types of connections, such as slidable key or spline joints, which permit adequate axial freedom or independence. In the transmission, it is usually desirable to definitely locate the torque converter output shaft axially because of the several associations with gearing, clutches and/or fluid circuits therein. Accordingly, that shaft is usually assembled with the transmission, and generally, it is also convenient to connect the reaction shaft to a stationary part of that transmission. Furthermore, for convenient assembly and ease of servicing, it is advantageous to make the transmission a separate assembly readily detachable from the torque converter and its supporting structure.

Some of the advantages of this spacing combination inside the rotatory casing are shown in the following explanation of the fluid thrusts of the members and the circumstances in the rotatory casing.

To readily comprehend and appraise the fluid thrusts on members, it is expedient to separate thrusts into two types and to separately consider the characteristics of each type. These two types of fluid thrusts are: the fluid circuit thrusts caused by entrance to exit changes of, the fluid pressure, the axial projected area of the fluid passage, and the directional trend of the passage; and, the shroud thrusts due to the opposite sides of either shroud, and/or different projected areas of the core and shell shrouds, being exposed to different fluid pressures.

The fluid passages of the principal pump member at the back end, and that of the principal turbine member at the front end, of the rotatory casing have prevailing radial dispositions, and usually have reverting curvature from entrances with decided axial trend to exits with major axial trend in the opposite axial direction. Consequently, each of these members has a very large fluid circuit thrust for all phases of operation from stall into the coupling phase, the thrusts tending to force the particular members axially apart.

One of the shroud thrusts, that of the shell shroud of the principal turbine member, is very large throughout all phases of operation. This shell shroud has an axially projected area which is quite large and is subjected to high fluid pressure in the annular chamber walled by that shroud and the adjacent front end of the rotatory casing. As will be shown at the conclusion of this discussion of fluid thrusts, that particular shroud thrust is used advantageously to balance to a major degree the resultant of the other thrusts of all the tubine and stator members.

Each member situated in the fluid circuit between the principal pump and the principal turbine members, usually has fluid passages which are predominantly axial, considering only the axial and the radial trends of the fluid circuit. The simplest torque converter has only one stator member which has blades disposed to cause pressure to kinetic energy conversion, and is situated in the inner path of the fluid circuit. For somewhat better performance, two adjacent stator members are used in the inner path, the preceding stator member usually having blades tending to cause kinetic to pressure energy conversion. For high torque multiplication and high performance, the torque converter is multi-staged with additional stator and turbine members situated in the outer path and/or in the inner path of the fluid circuit. These members are referred to as inner and outer members in accordance with the respective location in the inner and the outer paths. Suitable one-way devices should be included in the connecting structures to render each stator member, and in some combinations at least one turbine member, approximately one-way acting; thus, restricting the respective vectorial effect of each on the moment of momentum of the circulating fluid to the beneficial direction.

The shroud thrusts of the inner and the outer members generally are low forces; inherently so, at low speeds of operation, and by specific precautions and design provisions of these members for high speed operation. Accordingly, these particular thrusts are of minor importance to this specification. The variation of the centrifugal pressure in the rotatory casing is a predominate factor influencing the shroud thrusts of these members. For low rotatory speeds, the variation is small; but for high speeds, the variation may be quite large between cavities enclosing the shrouds. However, each member which is one-way acting, which includes each of the stator members, should be approximately balanced axially to permit rotation without excessive frictional drag in its free-whirling and non-functional phases of operation. It is a matter of giving each of these members specific consideration and providing proper labyrinth seals and/or balancing ports. The pressure in the annular enclosure around a shroud may be that at the entrance or that at the exit of the member inversely to the location of a labyrinth seal provided with an adjacent member shroud, and the ratio of projected areas exposed to the two pressures may be somewhat controlled by the diameter of that seal. Balancing ports, with or without radial offsets, may balance or modify the thrusts on opposite sides of a connecting flange or structure which partitions a particular core or shell cavity.

This specification is most concerned with the large axial forces of the inner and outer members which prevail mainly in the early phases of operation. These are predominantly fluid circuit thrusts which to a large degree are axial reactions of the obliquely disposed blades, and are greatest at stall.

In most combinations having plural stator members, some of the respective thrusts are in opposite directions, and, all of the stator members being stationary at stall and through at least the first phase of operation, it is advantageous to merge the thrusts together by having each stator member axially situated relative to a common hub which is axially located by a thrust bearing subjected to only the net resultant thrust of the stator group.

Each one-way acting stator member tends to exert a thrust which is high at stall and declines to minor influence when the member becomes non-functional and free-whirls. The direction of the thrust and the functional range depends on the location and the association of the particular member in the fluid circuit, and the disposition of its blades, normally being somewhat as follows: the final stator member in the inner path of the fluid circuit is functional throughout the torque conversion range from stall to the coupling point, and at stall exerts a large thrust towards the back end; a stator member adjacent and preceding the final stator member is functional for about two-thirds of the torque conversion range, and at stall exerts a medium thrust towards the front end; and, a stator member in the outer path of the fluid circuit is functional for about one-third of the torque conversion range, and at stall exerts a very large thrust towards the front end. Hence, the resultant thrust of plural stator members merged together usually is smaller than the separate thrusts of some members.

The spacing construction of this specification axially locates the stator hub with the turbine hub by means of a double-acting thrust bearing, thereby avoiding thrust bearing association of the stator hub with the pump hub. Except when coasting, the rotative speed of the turbine hub is slower than that of the pump hub, particularly so in the torque conversion range. Accordingly, it is better to have the stator hub in thrust bearing association with the turbine hub than with the pump hub; the rubbing velocity between the thrust bearing elements is lower, and the frictional loss is less. This is desirable for a torque converter with a single stator member, as well as those with plural stator members.

A torque converter may be multi-staged with one or more turbine members in the outer path and/or in the inner path of the fluid circuit. One or more of these members may be associated with the output shaft by gearing, and thus may rotate differently than the principal turbine member and the turbine hub. In the more simple multi-stage combinations, all of the turbine members may be rotationally unisonant in all phases with the principal turbine member and the turbine hub; even if a turbine member is associated with the turbine hub through a one-way device, it is usually rotationally unisonant therewith through about the first half of the torque conversion range.

A turbine member in either the outer path or in the inner path normally has a fluid circuit thrust which is large at stall and decreases rapidly therefrom. Inner and outer turbine members, which have blades similarly disposed relative to the circulating fluid, exert thrusts in opposite directions. These thrusts of turbine members axially situated with the turbine hub are merged together. This is particularly desirable for turbine members which are rotationally unisonant with that hub through at least the phases of operation near stall. This construction avoids undesirable thrust associations with adjacent pump or stator members which rotate at different speeds.

Excluding the shell shroud thrust of the principal turbine member, the combined thrust of the turbine member group and the stator member group is approximately equal and opposite, in all phases of operation, to the total thrust of the pump member or members which are axially situated at the back end of the rotary casing. At stall these thrusts are very large and increase as the rotative speed of the principal pump member increases. Each of these thrusts is counteracted by the fluid pressure thrusts of the annular chamber walled by the front end of the rotatory casing and the shell shroud of the principal turbine member, thereby avoiding excessive loading of the thrust bearing between the rotatory casing and the turbine hub.

There are various ways and means of regulating the pressure in that annular chamber to maintain a reasonable balance of the particular thrusts throughout all phases of operation. Usually, a high pressure is maintained in this annular chamber by communication with the exit of the principal pump member effected by omitting the labyrinth seal there between the pump shell and that of the adjacent turbine member. Ordinarily at stall, this particular pressure is too high, tending to squeeze the principal pump and turbine members together; so, it is customary practice to moderate the pressure by means of suitable ports through the turbine hub, thereby communicating the center portion of the annular chamber with the shaft cavity. Instead of communicating the annular chamber with the pump member exit, there may be ports through the shell of the principal turbine member to the fluid path thereof, and radially located to give the proper pressure. Also, the centrifugal pressure in the annular chamber may be regulated: according to the influence of the speed of the rotatory casing by having radial ribs on the inside surface of the front end of that casing, or according to the influence of the speed of the principal turbine member by having radial ribs on the outside of the shell of that member. Thus, with due consideration of the construction and the speed characteristics of the particular torque converter, the loading of the thrust bearing between the turbine hub and the rotatory casing may be kept low throughout all phases of operation.

Another involvement of fluid pressure is the variation of the axial length of the rotary casing. The fluid in the rotatory casing is maintained under pressure to avoid cavitation losses. This pressure together with the variable centrifugal pressure attending rotation, causes considerable axial extension of the rotatory casing, especially along the axial center. For spacing constructions having stator members, and in some combinations a turbine member, merely interposed between inner surfaces associated with the opposite ends of the rotatory casing, this extension permits considerable axial float of those members, and indefinite tip spacing between blades of those and adjacent members. The spacing construction of this specification maintains the desired axial spacing of the stator and the turbine members, and their blade tips, irrespective of the axial extension of the rotatory casing; the total extension variation being confined to the spacing at the entrance of a pump member, which for plural pump combinations is the first pump member in the direction of fluid circulation.

Visual examination of the appended drawings confirms that this construction is appropriate for convenient and consistent manufacture. Members of like character are connected into sub-assemblies which may be bench assembled, or assembled on lines or stations confluent to the final assembly where a few major assemblies may be readily joined into a complete torque converter. The arrangement permits gauge and visual inspection of most of the member spacings before enclosure in the rotatory casing.

As apparent throughout this generalized presentation and analysis of the external and the internal circumstances and requirements, the basic member spacing construction of this specification is more appropriate than any other known construction; not only for multi-stage torque converters, for which this construction is particularly advantageous, but also for simple torque converters having only one pump member, one turbine member, and one stator member.

The appended drawings illustrate the basic member spacing combination, and two particular innovations of this invention.

The first innovation is a variety of the basic combination in which the rotatory casing is distinctly one-way rotatory relative to the turbine hub. This innovation has a combined construction of a double-acting thrust bearing and a one-way device; the construction being combined in that certain parts thereof are unitary with dual features, and replace parts which are normally separate, for the thrust bearing and in a one-way device.

The second innovation is a variety of the basic combination in which the final stator member in the inner half of the fluid circuit is distinctly united rotationally with the stator hub; the stator hub being one-way rotatory by virtue of a one-way device included in the reaction structure associating that hub with the exterior support structure.

Obviously, the two innovations may be used together as an aggregation which may be considered a combination, in that, the normal construction of the second-named innovation conserves space inside the rotatory casing which may be needed to accommodate the construction desired for the first-named innovation. Figs. 16 and 17 illustrate two such combinations.

The basic member spacing combination and each of the two innovations are exemplified with two types of thrust bearings to axially locate a turbine hub with a rotatory casing, and a stator hub with the particular turbine hub; the two types being, sliding surface bearings and ball bearings. Either type of thrust bearing may be used in either of the two locations according to the particular requirements.

The thrust bearings are designated in accordance with their functional purposes: a thrust bearing situated and adapted between a stator hub and a turbine hub to axially locate the stator hub relative to the turbine hub is termed the stator hub bearing; and, a thrust bearing situated and adapted between a turbine hub and the front end of a rotatory casing to axially locate the turbine hub relative to the rotatory casing front end is termed the turbine hub bearing.

Two types of one-way devices are illustrated; namely, a conventional roller jamming type, and a sprag jamming type. It is realized that there are various other forms of these two types, as well as other types, which may be adapted for this particular usage.

The construction of the sprag type shown is considered novel; and, it is especially advantageous for preventing forward overrun of a turbine hub relative to a rotatory casing, but, as also illustrated, it may be used for rendering a stator member and/or a pump member one-way acting.

The drawings of this specification are as follows:

Figure 6 is a fragmentary section similar to that of Figure 2, but illustrating a combined construction of a roller type of one-way device and a sliding surface thrust bearing between the rotatory casing and the turbine hub;

Figure 7 is a fragmentary section through the roller type one-way device on line 7—7 of Figure 6;

Figure 8 is a fragmentary section similar to that of Figure 2, but illustrating ball thrust bearings, including a combined construction of a sprag type of one-way device and a ball thrust bearing between the rotatory casing and the turbine hub, and showing the inner stator members with sprag type one-way devices;

Figure 9 is a fragmentary section through the sprag type one-way device on line 9—9 of Figure 8;

Figure 10 is an enlarged view of two adjacent sprags obliquely exploded apart showing the neighboring sides and the opposing spring seats thereof;

Figure 11 is a radial half-section of an extensively multi-staged torque converter illustrating somewhat diagrammatically four turbine members axially situated with a turbine hub, and five stator members axially situated with a stator hub;

Figure 13:
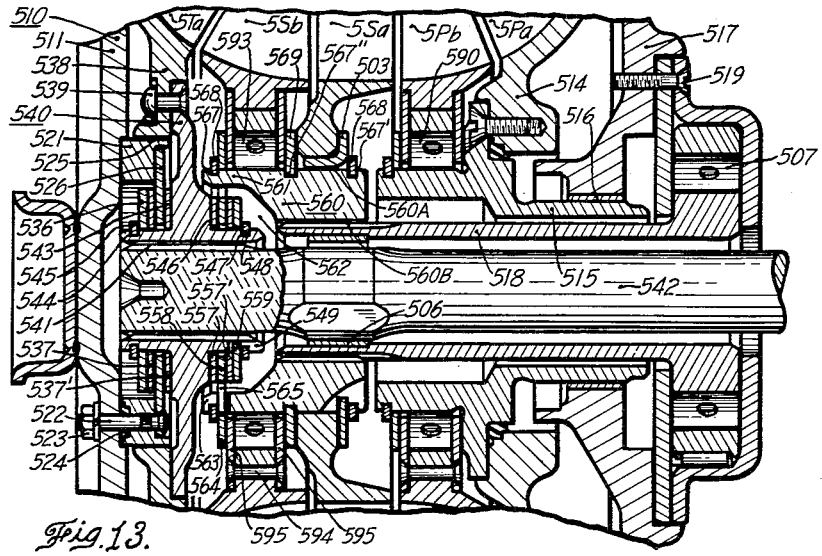
Figure 13 is an enlarged fragmentary section through the axis of the torque converter combination of Figure 12 showing the construction which axially locates the stator hub with the turbine hub and the turbine hub with the front end of the rotatory casing.
Figure 16:
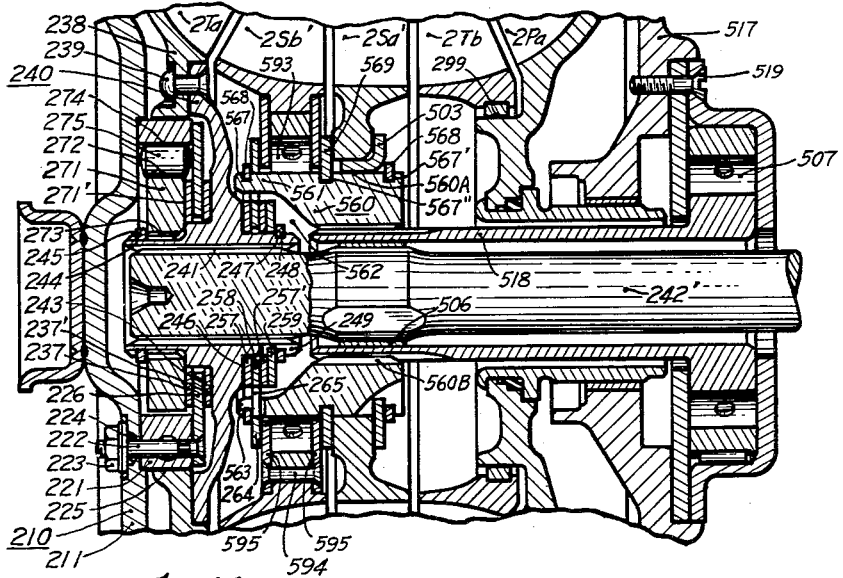
Figure 17:
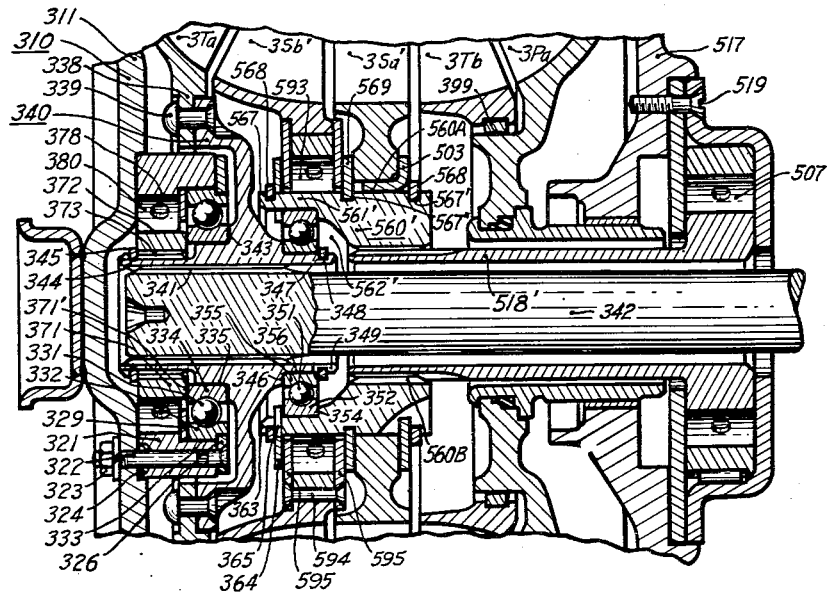

Figure 16 is a fragmentary radial section of a combination in which the construction shown in Fig. 6 is modified, the stator hub and reaction structure thereof being replaced by the one-way rotatory stator hub arrangement illustrated in Fig. 13; and, Figure 17 is a fragmentary radial section of a combination in which the construction shown in Fig. 8 is modified, the stator hub and reaction structure thereof being replaced by the one-way rotatory stator hub arrangement illustrated in Fig. 13.

To render the different constructions illustrated clear and definite without profuse repetition of description, components, parts, and elements of the different constructions, which respectively therein have somewhat similar influence or function, are assigned reference numbers with the same tenths and unitary digits, but preluded with a particular hundredths digit which is distinctive for each construction. Similarly, the reference letters of the bladed members are preluded with the particular hundredths digit.

Figure 2:
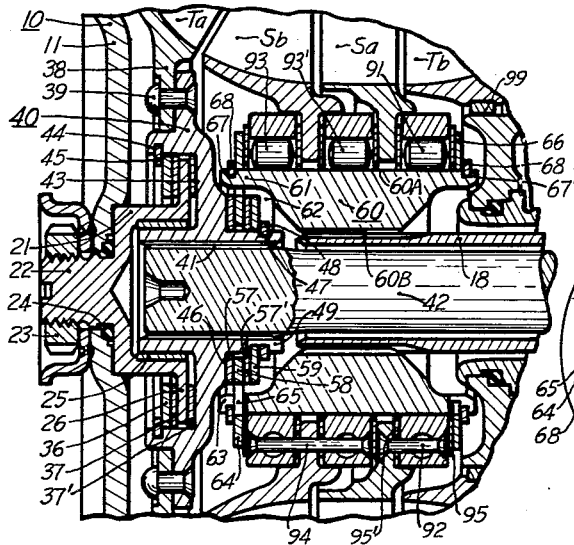
Figure 2 is an enlarged fragmentary section through the axis of the torque converter combination of Figure 1 showing the construction which axially locates the stator hub with the turbine hub and the turbine hub with the front end of the rotatory casing.
Figure 3:
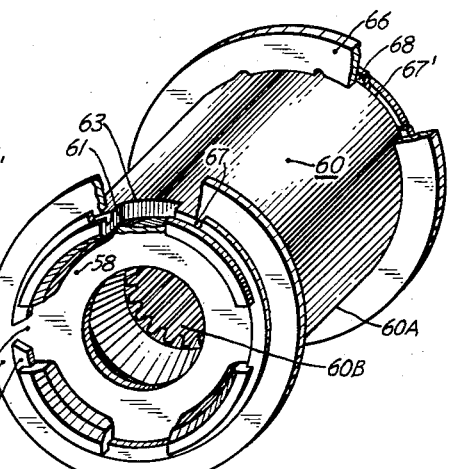
Figure 3 is an oblique view of the stator hub construction of Figure 2.
Figure 1:
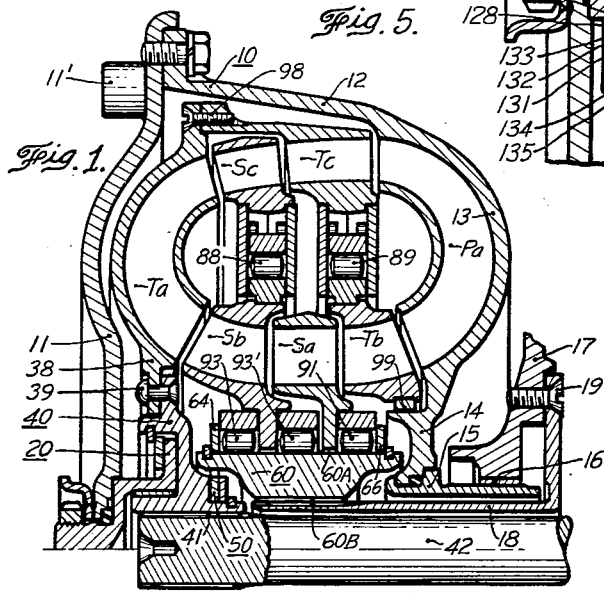
Figure 1 is a radial half-section of a torque converter illustrating somewhat diagrammatically three turbine members axially situated with a turbine hub, three stator members axially situated with a stator hub, and sliding surface thrust bearings for the turbine and the stator hubs.

The member spacing embodiment illustrated in Figures 1, 2, and 3 may be considered the preferred; however, the construction which is most suitable depends on the type of the torque converter. The sliding surface type of double-acting thrust bearing shown therein is somewhat cheaper than the ball type, and is usually preferable for high speed torque converters as used for automotive engines. For torque converters designed for heavy duty low speed engines, the ball type of thrust bearing tends to be more suitable than the sliding surface thrust bearings.

Also, the actual physical construction which is most desirable depends on the particular space restrictions, and the manufacturing costs which are somewhat influenced by the volume of production. For example, in Figure 2, the turbine hub thrust reaction disc, which is the mooring disc therefor, has a mooring connection extending from its inner periphery to the rotatory casing. In Figure 13, a comparable thrust reaction disc is illustrated attached to the rotatory casing at its outer periphery. The latter construction has a cheaper turbine hub but has screws and nuts protruding from the exterior of the casing which may interfere with the flywheel of the engine, whereas the fastening nut of Figure 2 avoids such an interference inasmuch as it has a single attachment boss and nut nested in the centering cup.

Most of the constructions are exemplified for torque converter combinations of members arranged in a fluid circuit somewhat as illustrated by the multi-stage combination of Figure 1. From these showings, the appropriate construction for torque converters having fewer members is rather obvious; it is mostly a matter of leaving out the respective accommodations required for the omitted member or members. As stated in the forepart of this specification, this basic member spacing construction is illustrated for many torque converter combinations in the copending applications listed there.

Figure 1 shows somewhat diagrammatically a torque converter combination having: a pump member integral with the back end portion of a rotatory casing; three turbine members axially situated with a turbine hub which is axially located with the rotatory casing; and three stator members axially situated with a stator hub which is axially located with the turbine hub.

The rotatory casing 10 consists mainly of two separate portions; namely, front, and back portions. The front portion is the front end cover 11. A plurality of knobs 11' secured thereto afford a convenient means of attachment to the power source; a respective screw through the flywheel web being threaded into each knob. The back portion of the rotatory casing 10 is comprised of: the shell shroud 13 of the integrated pump member Pa, a skirt-like driving flange 12, the pump member hub element 14, and a hub sleeve 15.

The external stationary structure 17 supports the back end of the rotatory casing by a radial bearing association 16 with the hub sleeve 15. This stationary structure also rotationally secures and supports the hollow reaction shaft 18 by screws 19. These support arrangements are diagrammatic, but are functionally equivalent to the various conventional constructions.

The turbine hub 40 is axially located relative to the front end cover 11 of the rotatory casing 10 by the interposed double-acting thrust bearing construction 20. Splines 41 compel rotational unity, but allow axial freedom, of the turbine hub 40 relative to the torque converter output shaft 42; that particular exemplification being a suitable construction of an axial slip joint type of rotatory drive connection.

The turbine members are axially situated with the turbine hub as a structural train. The principal turbine member Ta is fixed to the turbine hub 40 by a plurality of rivets 39 through a flange of that hub and a shell flange 38 integral with that turbine member. Turbine member Tc is shown fixed to turbine member Ta; a shell shroud extension of one being fastened to a mating shell shroud extension of the other by screws 98. Turbine member Tb is appended to turbine member Tc by one-way device 89 interposed between their respective core shrouds. This device has a double-acting thrust bearing which axially locates turbine member Tb relative to turbine member Tc. The device also renders turbine member Tb one-way acting; capable of extracting energy from the circulating fluid and able to transmit it through the structural train of turbine members Tc and Ta and the hub 40 to the output shaft 42, but ineffective for transferring energy conversely. This turbine member Tb is maintained concentric with the axis by a radial bearing association 99 with the pump member hub element 14.

The stator hub 60 is axially located wtih the turbine hub 40 by a double-acting thrust bearing construction 50. This stator hub is radially supported by the reaction shaft 18; and mating splines 60B thereof maintain the hub rotationally stationary with, but allow axial freedom relative to, that reaction shaft.

One outer stator member and two inner stator members are axially situated with the stator hub 60. Inner stator members Sb and Sa are successive members in the fluid circuit. Each is rotatory forwardly but not backwardly relative to the stator hub 60, being assocaited therewith by one-way devices for which the smooth outer surface 60A of the stator hub is the common inner drum. The construction of these one-way devices is the same as that shown in Figure 7, except that for these stator members, the outer ring inner surfaces between the roller cavities are in radial bearing assocaition with the outer surface 60A of the stator hub to radially support the stator members.

The attachments of stator members Sa and Sb to their one-way devices and their axial association with the stator hub is clearly shown in the lower half of Figure 2. A shell shroud flange integral with stator member Sa is fixed to the outer ring of one-way device 91 by a plurality of rivets 92. Similarly, a shell shroud flange integral with stator member Sb is fixed to the outer rings of two similar one-way devices 93 and 93' by a plurality of rivets 94; two one-way devices being used to provide adequate torque capacity for this stator member and stator member Sc which is appended thereto. Each of these one-way devices has a pair of guide discs 95 and 95' to axially guide the respective jamming rollers. As shown, these elements and components of stator members Sa and Sb are placed side by side on the stator hub 60, the array being axially situated therewith between the inner sides of flanging discs 64 and 66 respectively retained at the front and back ends of stator hub 60.

Referring back to Figure 1, the outer stator member Sc is appended to stator member Sb by one-way device 88 interposed between their respective core shrouds. This one-way device construction prevents backward but permits forward rotation of stator member Sc relative to stator member Sb; and has, a double-acting thrust bearing association axially locating, and a radial bearing association radially supporting, stator member Sc relative to stator member Sb.

Figure 2, which is an enlarged fragmentary view of Figure 1 through the axis, clearly showing the details of the construction for axially locating, the turbine hub 40 relative to the front end cover 11 of the rotatory casing 10, and the stator hub 60 relative to the turbine hub.

The mooring component is the small drum 21 centered with, and abutted against an inside surface of, the front end cover 11; and, axially fixed thereto by the ring nut 23 on the drum threaded spindle 22 which passes through the front end cover, the attachment including a seal 24 encircling the spindle.

The turbine hub 40 is radially centered with the drum by a radial bearing association 25 therewith.

The turbine hub 40 is axially located with the drum 21 by a sliding surface double-acting thrust bearing having: a thrust reaction disc which is the radial flange 26 integral with the drum 21; an annular thrust surface 43 of the front side of the turbine hub in thrust bearing association with the back side of flange 26; and, an annular thrust disc 36 situated with the back side thereof in thrust bearing association with the front side of flange 26, and axially retained with the turbine hub by a turbine hub ring groove 44 bordering, and a snap ring 45 therein abutting, the front side of the thrust disc—the particular thrust bearing associations shown, respectively, having interposed thrust bearing washers 37' and 37.

Figure 3 is an oblique view of the stator hub construction sectionally illustrated in Figures 1 and 2. As previously stated in the description of Figure 1, stator members Sa and Sb are axially situated with the stator hub 60 by having their particular shell elements and one-way devices axially confined between the back side of flanging disc 64 and the front side of flanging disc 66. These discs are shown axially retained with the stator hub by two snap rings 68: one, situated at the front end in the stator hub ring groove 67, and abutting the front side of flanging disc 64; the other, situated at the back end in the stator hub ring groove 67', and abutting the back side of flanging disc 66.

The front end of the stator hub has an annular wall 61 protruding axially therefrom, and surrounding a cavity 62. Across the wall, there are a plurality of radial slots 63, four being shown in Figure 3. Formed integrally with the front end flanging disc 64, is an annular thrust disc 58, which is the anchoring element for the stator hub; the particular discs being conjoined by a plurality of integral spokes 65, each of which extends through a respective slot 63 of the stator hub. Thus, the thrust disc 58 is axially located with the stator hub.

The sliding surface double-acting thrust bearing which axially locates the stator hub 60 with the turbine hub 40 consists of: the above described thrust disc 58; an annular thrust reaction surface 46 of the back side of the turbine hub in thrust bearing association with the front side of the thrust disc 58; and, an annular thrust reaction disc 59 situated with the front side thereof in thrust bearing association with the back side of the thrust disc 58, and axially retained with turbine hub by a turbine hub ring groove 47 bordering, and a snap ring 48 therein abutting, the back side of the thrust reaction disc—the particular thrust bearing associations shown, respectively, having interposed thrust bearing washers 57 and 57'.

As has been shown and described, the spacing combination of Figures 1, 2, and 3 radially supports, and axially locates with the front end cover 11 of the rotatory casing 10, the turbine hub 40, and turbine members Ta, Tc, and Tb, axially situated therewith; and, axially locates the stator hub 60 with that turbine hub, and maintains turbine members Ta, Tc, and Tb, and stator members Sa, Sb, and Sc in axial spaced relationship with each other.

It is fitting here to point out the convenience of the construction for mass production assembly; it permits the simultaneous fabrication of subassemblies which may be readily joined into a complete torque converter with only a few operations. Referring to Figure 1, the following subassemblies may be made independently: the back end of the rotary casing with the hub sleeve 15; turbine member Ta, and thrust bearing 20 with turbine hub 40; turbine members Tc and Tb; and stator members Sa, Sb, and Sc with stator hub 60. Then as shown in Figure 2, the stator group may be readily attached to the turbine hub by snap ring 48, the turbine hub having a radial slot 49 permitting that ring to be spread for installing it into, or removing it from, the ring groove 47 with an ordinary pair of side-lip snap ring pliers inserted through the splined hole of the stator hub. The remaining operations are: attachment of the subassembly of turbine members Tc and Tb to turbine member Ta; fastening the front end cover 11 to the mooring drum spindle 22; and finally, joining the front and back portions of the rotatory casing 10 together, making a complete torque converter which may be easily attached to the power source and to a supplementary mechanical transmission.

Figure 4:
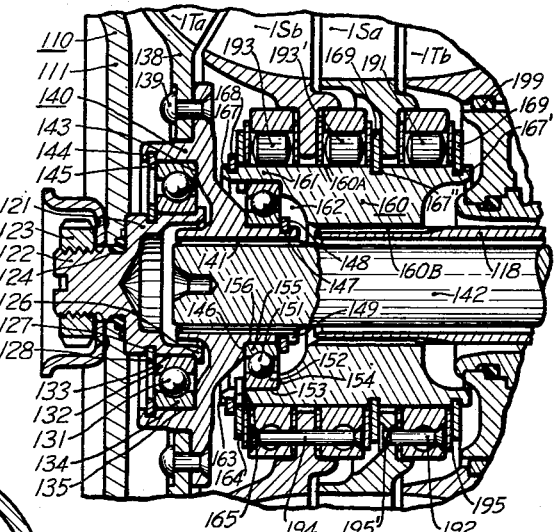
Figure 4 is a fragmentary section similar to that of Figure 2, but illustrating ball thrust bearings instead of sliding surface bearings, and showing snap-on flanging discs, one between the inner stator members, and one at the back end of the stator hub.

Figure 4 illustrates a construction of which the principal departure from that of Figure 2 is the use of ball type double-acting thrust bearings in place of the sliding surface type. Of course, the various attaching parts are appropriately modified and adapted to properly accommodate the ball type bearings. A minor departure is the use of a snap-on type of flanging disc at the back end of the stator hub. It is also shown interposed between the two stator members on the stator hub.

The double-acting thrust bearing construction axially locating, and radially supporting, turbine hub 140 relative to the front end cover 111 of the rotatory casing includes a double-acting ball thrust bearing comprising: an inner ball race 132, a concentric outer ball race 134, and a plurality of circumferentially spaced balls 131 between the races.

The inner ball race 132 is associated with the mooring component which a small drum 121; accordingly, the inner ball race is a thrust reaction element. It is centered with the drum on a circular mounting 133; and, it is axially fixed with the drum between the drum flange 126 and a snap ring 128 in the ring groove 127 around the drum.

The outer ball race 134 is a thrust element, being associated with the turbine hub 140. It is centered with the turbine hub in the circular mounting 135 thereof; and, it is axially fixed with the turbine hub, being interposed between the front side surface 143 thereof and the snap ring 145 in the ring groove 144 around the turbine hub.

The double-acting ball thrust bearing between the stator hub 160 and the turbine hub 140 comprises: an inner ball race 155 which, being located with the turbine hub, is a thrust reaction element; a concentric outer ball race 152 which, being situated with the stator hub, is a thrust element; and, a plurality of balls 151 circumferentially spaced between the races. As indicated by the ensuing recital of the attachments of these races, this bearing axially locates the stator hub with the turbine hub; and, if desired, it may be used to radially support the stator hub in lieu of the customary support by the reaction shaft 118.

The inner ball race 155 is centered on the turbine hub 140 on a circular mounting 156 thereof; and, is axially fixed with the turbine hub between a back face abutment 146 of that hub and a snap ring 148 situated in the ring groove 147 around the turbine hub.

If it is desirable to radially support the stator hub 160 relative to the turbine hub 140, the outer ball race 152 is centered in the circular recess 153 in the front end of the stator hub. Irrespective of the radial mounting, the outer ball race 152 is axially fixed with the stator hub, being interposed between a recessed front surface 154 and the back sides of spokes 165 which are integral with the front end flanging disc 164, and extend through radial slots 163 across the front end wall 161 of the stator hub, and protrude into the hub cavity 162 to abut the front side of the outer ball race. The construction of this flanging disc and its retention with the stator hub, is the same as that shown in Figure 3, except that the thrust disc 58 is omitted.

Figure 5:
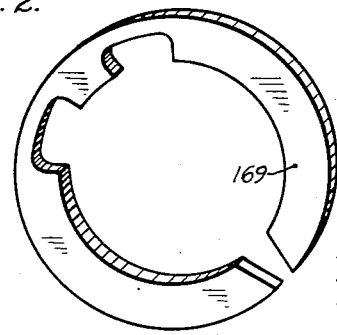
Figure 5 is an oblique view of the snap-on flanging discs of Figure 4.

At the back end of the stator hub 160 a snap-on type of flanging disc 169 is shown situated in stator hub ring groove 167'. Figure 5 is an oblique view of one suitable form of the snap-on flanging disc 169. The principal advantage of this disc is that it conserves axial space and shortens the stator hub, as is apparent in the described usage at the back end thereof, by the thickness of the snap ring otherwise required. Rotational creep of the flanging disc may be avoided by keying it to the stator hub; for instance, a notch in the inner edge of the flanging disc straddling a small pin pressed in a radial hole in the respective ring groove.

Another snap-on flanging disc 169 is illustrated in Figure 4 situated in the stator hub ring groove 167'' between the respective attaching components of stator members 1Sa and 1Sb. The need for this intermediate flanging disc is dependent on the particular character of the thrusts of those members; if the thrust of one member increases the thrust of another relative to its stator hub retention when it is rotating therewith, then the intermediate flanging disc is desirable. For this usage, the snap-on flanging disc replaces two ordinary flanging discs and an interposed snap ring; thus, reducing the number of parts, conserving axial space, and shortening the stator hub.

The remainder of the construction shown in Figure 4 is practically the same as described for Figures 1, 2, and 3.

Figures 6 and 8 illustrate two constructions of one particular innovation of this member spacing invention, each construction having a one-way device structurally combined with a double-acting thrust bearing construction between a turbine hub and the front end of a rotatory casing. Otherwise, these two constructions of Figures 6 and 8 are in general comparable respectively to those described for Figures 2 and 4. The particular one-way devices of this innovation prevent forward speed lag of the rotatory casing relative to the turbine hub; that is, the coast drive attained is mechanically positive from the torque converter output shaft through those components to the power source. Some of the functional advantages of the arrangement for automotive usage are: it provides greater downhill engine braking; it affords low speed push-starting of the engine; and, it prevents engine stumbling and dying while the automobile has any forward motion whatsoever.

In Figure 6, the construction between the turbine hub and the front end of the rotatory casing is a novel and unique structural blend of a sliding surface double-acting thrust bearing, and an ordinary cam and roller type of one-way device. The mooring components is the support ring 221 centered with, and abutted against an inside surface of, the front end cover 211 of the rotatory casing 210. The annular thrust reaction disc 226, which also is a roller guide plate, abuts the back side of the support ring. A plurality of circumferentially spaced screws 222 axially fix and rotationally unite the thrust reaction disc with the support ring, and the support ring with the front end cover, each screw passing those parts, and having an encircling seal 224, and an external fastening nut 223.

Turbine member 2Ta has a shell flange element 238, which is attached to turbine hub 240 by rivets 239, and has a radial bearing association 225 with the support ring 221; thereby, centering the turbine hub with the front end cover, and radially supporting the turbine members fastened relative to the turbine hub.

The turbine hub 240 has an annular thrust surface 243 of the front side thereof in thrust bearing association with back side of the thrust reaction disc 226. That association, as shown, includes an interposed thrust bearing washer 237'. The drum 271 of the one-way device is mounted on the turbine hub, and situated with an annular thrust surface 271' of the back side of the drum in thrust bearing association with the front side of the thrust reaction disc 220. That association, also is shown with an interposed thrust bearing washer 237. The drum is rotationally united with the turbine hub by mating splines 273, and axially retained therewith by a turbine hub ring groove 244 bordering, and a snap ring 245 therein abutting, the front side of the drum.

The one-way jamming construction is shown in Figure 7 which is a fragmentary section on line 7—7 of Figure 6. The support ring 221 has, circumferentially spaced around the inner portion thereof, a plurality of cam surfaces 274, each of which bounds a wedge-shape space with the smooth cylindrical outer surface 272 of the drum 271. A smooth cylindrical roller 275 is situated in each wedge-shape space. Each roller is urged towards the converged end of a respective wedge-shape space into the jamming situation by a respective urging means consisting of, a spring cup 277, and an urging spring 276, holed in the support ring 221 with the spring reacting on one of the support ring screws 222. Consequently, in one direction, the rollers jam and prevent relative rotation between the support ring and the drum; but in the opposite direction, the rollers are deflected away from the jammed situation by frictional drag, permitting nearly free relative rotation.

As has been described, the combined construction illustrated in Figures 6 and 7 radially supports, and axially locates with the front end cover 211 of the rotatory casing 210, the turbine hub 240, and each turbine member attached thereto; and permits forward but prevents backward rotation of the front end cover of the rotatory casing relative to the turbine hub. The remainder of the construction illustrated in Figure 6, including that axially situating stator members with the stator hub 260, and that axially locating the stator hub with the turbine hub 240, is practically the same as that described for Figures 1, 2, and 3.

In Figure 8, the illustrated construction between the turbine hub and the front end of the rotatory casing is a combination of a double-acting ball thrust bearing and a novel and unique sprag type of one-way device. The double-acting ball thrust bearing, which radially supports and axially locates the turbine hub 340 relative to the front end cover 311 of the rotary casing 310, comprises: an outer ball race 332 which, being axially located relative to the front end cover 311, is a thrust reaction element; a concentric inner ball race 334 which, being axially fixed with the turbine hub 340, is a thrust element; and a plurality of balls 331 circumferentially spaced between those races.

The mooring component is the support ring 321, centered with, and abutting an inside surface of, the front end cover 311. The outer ball race 332 is centered and axially fixed with the support ring being situated in the circular mounting 333 thereof; and having front and back surfaces interposed between the back side of the sprag guide disc 329 which is shouldered in the support ring, and the front side of the race retainer disc 326. A plurality of circumferentially spaced screws 322 axially fix and rotationally unite the race retainer disc with the support ring, and the support ring with the front end cover, each screw passing through those three parts, and having an encircling seal 324, and an external fastening nut 323.

The inner ball race 334 is centered on a circular mounting 335 of the turbine hub 340, and is axially fixed therewith, being interposed between the turbine hub front side surface 343 and the annular back side surface 371' of the one-way device inner ring which is the drum 371; that drum being rotationally united and axially retained with the turbine hub respectively, by mating splines 373, and by the turbine hub ring groove 344 bordering, and the snap ring 345 therein abutting, the front side of the drum.

The construction of the sprag one-way device is shown in Figure 9 which is a fragmentary section on line 9—9 of Figure 8. Figure 10 is an enlarged view of two adjacent sprags obliquely exploded apart showing the neighboring sides and the opposing spring seats thereof.

The support ring 321 has a smooth cylindrical inner surface 378 which is concentrically circumambient with, and radially spaced apart from, a smooth cylindrical outer surface 372 of the drum 371. These surfaces bound an annular space occupied by a plurality of one-way jamming sprags 380, spaced somewhat adjacently around that space.

Each of the sprags 380 has at its outer end, a smooth gripping surface 379 in axial line contact with the support ring inner surface 378; and at its inner end, a smooth gripping surface 381 in axial line contact with the drum outer surface 372. The distance between the inner and outer axial lines of contact of each sprag is slightly greater than the radial distance between the drum outer surface and the support ring inner surface; so that, the lines of contact of each sprag lie in a respective plane which is slightly oblique from the particular radial plane that passes through the respective inner line of contact, each sprag being oblique in the same angular direction. The permissible angle of obliquity depends somewhat on the influence of the separate means urging the jamming situation; otherwise, for the sprag smooth surface jamming and gripping illustrated, the tangent of the angle of obliquity at an axial line of contact must not exceed the coefficient of friction existing at the particular contact.

In the preceding paragraph, the contacts of the sprag gripping surfaces with the drum and the support ring surfaces were referred to as axial lines of contact in order to clearly describe the relative disposition of the sprags. Actually, these contacts exist only as lines for light contact pressures; the jamming pressures are very large at these contacts when high torque is exerted in the jammed direction, and the surfaces are compressed into axial bands of surface contact, of which the lines of effective pressure represent the nominal lines of contact.

The support ring 321 is rotatory for all phases of operation, being rotationally united to the front end cover 311; and, except for occasional and progressive creep, the sprags 380 rotate with the support ring, being centrifugally held against the inner surface 378 thereof. So, it is preferable to situate at the outer ends of the sprags, the abutting relationship between adjacent sprags by which they are circumferentially spaced. Accordingly, near the outer ends, a toe 386 of each sprag abuts, or nearly abuts, a heel 387 of an adjacent sprag. Near the inner ends of the sprags, there is a similar abutting relationship between adjacent sprags, but usually with somewhat more clearance between the toe 384 and the heel 385 of adjacent sprags.

In the construction illustrated in Figure 9, a plurality of compression coil springs 376 urge the sprags 380 into the jamming situation with the drum and the support ring. A spring is interposed between each pair of opposing sides of adjacent sprags as follows: one coil end is situated in a spring seat 383 in the side of, and near the outer end of, one sprag; and, the opposite coil end is situated in an opposing spring seat 382 in the opposing side of, and near the inner end of, the adjacent sprag. Accordingly, each spring is disposed with its coil axis considerably oblique from tangency with an imaginary circle (of which an arc 3Cr is illustrated) which is concentric with the drum outer surface 372, and intersects the coil axis midway between the coil ends. These springs 376 urge the inner and the outer end of the sprags 380 in opposite circumferential directions into the jamming situation.

The sprags being in a closed circular array, each sprag 380 has an opposing pair of spring seats 382 and 383, offset from each other so that compression springs seated therein induce a respective couple on each sprag urging each towards radial disposition into the jamming situation with the drum and the support ring.

As has been disclosed this sprag one-way device prevents backward but permits forward rotation of the rotatory casing front end cover 311 relative to the turbine hub 340.

It is realized that some of the urging springs 376 may be omitted if the clearances between the toes 384 and heels 385 of adjacent sprags 380 are maintained close enough to effect simultaneous jamming and releasing of adjacent sprags.

Also, it is realized that with certain modifications, this sprag one-way device may serve as a radial bearing to support one or more attached members. With the provision of suitable stops at the toes 384 and heels 385 to restrict the released disposition of the sprags 380, and thus to limit the radial clearance between the sprag surfaces 381 and the drum surface 372, the multiplicity of those sprag surfaces relative to the drum surface simulate a ramp type of radial bearing which is adequate to radially support a light weight torque converter member. For greater radial bearing capacity, several groups of sprags may be replaced by slipper bearing blocks. For example, in a stator member one-way device having space for thirty sprags, eighteen sprags in three groups of six sprags and three intervening bearing blocks may be used. Each of these blocks should have concentric outer and inner arcuate surfaces respectively in radial bearing association with the support ring surface 378 and the drum surface 372. The opposite ends of each block should have features comparable to those of the opposite sides of a sprag with regard to toe 386, heel 387, and spring seats 382 and 383, but at the inner edge, the toe 384 and heel 385 should be abbreviated to allow unrestricted jamming and releasing of the adjacent sprags.

Relative to the utility of this novel sprag one-way device illustrated in Figure 9, some of the advantages are presented in comparison with the roller device shown in Figure 7.

The outer ring, herein termed the support ring, of the sprag device is much easier and cheaper to manufacture than that of the cam device with the internal cam surfaces. Admittedly, the sprags are more difficult and expensive to make than the cylindrical rollers, but, as is well known, the sprags may be processed as sections cut off of stock rolled and profiled in strip form.

The sprag device has much higher torque capacity than the roller device of similar proportions; so, for a particular torque requirement, the sprag device may be made smaller, and accommodated in less space. A principal torque limitation of a jamming device is the surface stress and indentation of the jammed contacts; hence, for comparable drums, the torque capacity is approximately proportional to the number of jammed contacts on the drum surface. About four sprags may be accommodated in the circumferential space required for one roller in Figure 7; accordingly, for equal size drums, the sprag device has a torque capacity about four times larger than that of the roller device.

A very important advantage of this sprag device illustrated is that it may be constructed with the jam urging characteristics which are most appropriate for the particular usage; that is, it may be constructed so that the strength of the jam urging influences is approximately independent of rotational speed, or with the strength of those influences modulated by rotational speed.

In a one-way device used to prevent forward speed lag of the rotatory casing relative the turbine hub, as illustrated in Figures 6 and 8, it is very desirable to have the strength of the jam urging influences approximately independent of the rotational speed. For such usage, a one-way device must be operative over a wide speed range; for instance in an automotive application, its jamming elements must jam and grip whenever the vehicle coasts irrespective of the actual speed of the vehicle.

In a one-way device used to render a stator member one-way rotatory, it is advantageous to have the strength of the jam urging influences reduced by rotational speed. For that usage, jamming and gripping occurs only when the stator member is stationary in the transition from forward rotation to a tendency to rotate backwardly. So, the jam urging influences may be speed moderated to reduce the drag and the wear of the jamming elements in the overrun phase.

In the roller device shown in Figure 7, the cam surface obliquity causes the centrifugal force of each roller to exert a tangential component in opposition to the respective urging spring; hence, these springs must be unusually strong to insure responsive jamming and gripping when needed in the highest speed range. These strong springs are detrimental for low speed overrun operation; the jam urging is excessive, and causes objectionable drag, and potential wear and scuffing of the gripping surfaces.

To render the strength of the jam urging influences in this novel sprag device approximately independent of rotational speed, it is simply a matter of proportioning the sprag section, so that the center of gravity of the sprag 380 is approximately in radial alignment with the axial line of contact of the sprag outer surface 379 at the support ring surface 378. For the slight variation in sprag obliquity from the jammed to the released situation, this radial alignment tends to be maintained by the rolling action at the surface contact and the attending circumferential shift there of the axial line of surface contact.

Of course, by appropriately offsetting the center of gravity of the sprag section from the radial alignment with the surface contact at the support ring, the strength of the jam urging influences may be speed reduced. Such a version of this sprag one-way device may be used for stator members, and applications with comparable needs, in lieu of a roller device to provide the required torque capacity in less space, but without incurring greater overrun drag.

Referring back to Figure 8 to complete the description of that member spacing construction. The double-acting ball thrust bearing construction which axially locates the stator hub 360 with the turbine hub 340 is the same as illustrated in, and described for, Figure 4. The stator member retention is similar to that shown in Figure 3. The shell attachments and their elements of stator members 3Sa and 3Sb are arrayed side by side on the cylindrical outer surface 360A of stator hub 360, and are axially confined between the inner sides of flanging discs 364 and 366. These discs are axially retained with the stator hub by two snap rings 368: one, situated at the front end in the stator hub ring groove 367, and abutting the front side of flanging disc 364; the other, situated at the back end in the stator hub ring groove 367′, and abutting the back side of flanging disc 366.

The one-way devices 391 and 393 of stator members 3Sa and 3Sb, and the attachments therewith, are different from those described heretofore. Both of these one-way devices are the sprag type with sprags arranged somewhat as illustrated in Figure 9, but around the stator hub outer surface 360A. The outer rings are rotationally secured to the stator members by hardened serrations of their outer surfaces pressed into circular bores of the stator members. The outer ring of one-way device 391 with two sprag guide discs 395, one on each side, is axially fixed with stator member 3Sa; being axially retained between an abutting surface thereof and snap ring 392. The outer ring of one-way device 393, and the sprag guide discs 395 and 395′ thereof, are axially fixed with stator member 3Sb between two snap rings 394. This stator member is radially supported by a circular flange of sprag guide disc 395', the inner surface of the flange being in radial bearing association with the stator hub outer surface 360A. The outer surface of this particular flange has a radial bearing association with a shell shroud element of stator member 3Sa, whereby that member is radially supported. So, as has been described, stator members 3Sa and 3Sb are axially situated with stator hub 360 which is axially located with turbine hub 340.

Figure 11 shows somewhat diagrammatically, the basic member spacing combination of this specification adapted to an extensively multi-staged torque converter. This illustration is included to demonstrate the convenience and the versatility of the basic construction for axially spacing and supporting turbine and stator members relative to each other and to the rotatory casing. In this combination, four turbine members are axially situated with a turbine hub, and five stator members are axially situated with a stator hub.

Except for the attachments of the members, the construction is fundamentally similar to that illustrated in, and fully explained for, Figure 1. As disclosed in Figures 1 and 2, the turbine hub 440 is axially located with the front end cover 411 of the rotatory casing 410 by a sliding surface double-acting thrust bearing construction 420; and, the stator hub 460 is axially located with the turbine hub 440 by a sliding surface double-acting thrust bearing construction 450. The attachment and the retention of flanging disc 464 to the front end of the stator hub 460, and the retention of flanging disc 466 to the back end thereof, is the same as disclosed in Figure 3.

Four turbine members are axially situated with the turbine hub 440. Turbine member 4Ta is fixed to that hub by a plurality of rivets 439. Turbine members 4Tc and 4Td are fixed to turbine member 4Ta; respective shell shroud extensions of those members being fastened together by a plurality of screws 498. And, turbine member 4Te is fastened by a core shroud extension thereof, and a plurality of screws 401 to the core shroud of turbine member 4Ta.

Five stator members are axially situated with the stator hub 460; three of which are axially confined therewith, each having a respective one-way device around a smooth cylindrical outer surface 460A of the stator hub. Stator member 4Sa is attached to one-way device 491 by headed pins 492, and is axially confined on the stator hub between flanging discs 466 and 469; stator member 4Sb is attached to device 493 by pins 494, and is confined between flanging discs 469 and 469'; and, stator member 4Se is attached to device 496 by pins 497, and is confined between flanging discs 464 and 469'. Flanging discs 469 and 469' are the snap-on type shown in Figure 5. Each one-way device includes a pair of guide discs 495 shrouding the opposite sides thereof, and retained by the respective headed pins mentioned. The jamming elements are shown diagrammatically as rollers, but a sprag type may be used instead of the rollers shown.

The two outer stator members 4Sc and 4Sd are fastened together, by respective core shroud elements thereof, and a plurality of screws 402. A one-way device construction 488 interposed between that united core structure and the core shroud of stator member 4Sb, axially locates, radially supports, and permits forward but prevents backward rotation of, stator members 4Sc and 4Sd relative to stator member 4Sb.

Two pump members 4Pa and 4Pb are axially situated with the back portion of the rotatory casing 410, the principal pump member 4Pa being integral therewith. A one-way device 490 interposed between the respective core shrouds, axially locates, radially supports, and permits forward but prevents backward rotation of, pump member 4Pb relative to pump member 4Pa.

Figure 15:
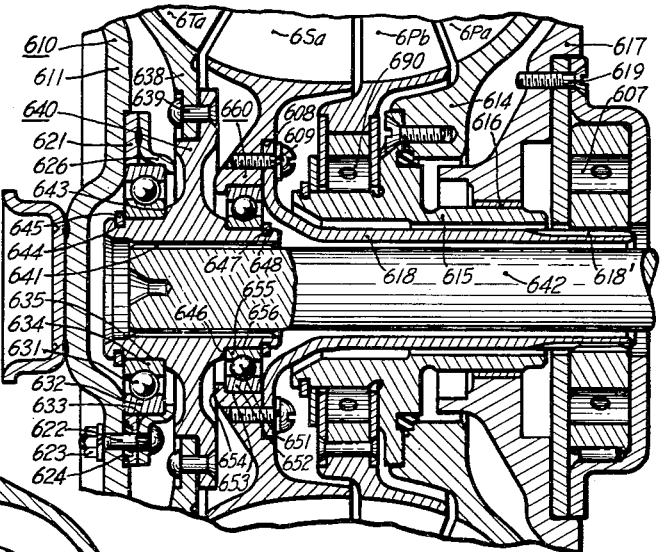
Figure 15 is a fragmentary radial section of a torque converter having only one inner stator member, illustrating a stator hub integral with that member and one-way rotatory relative to the external support structure, and ball thrust bearings for the turbine and the stator hubs.
Figure 12:
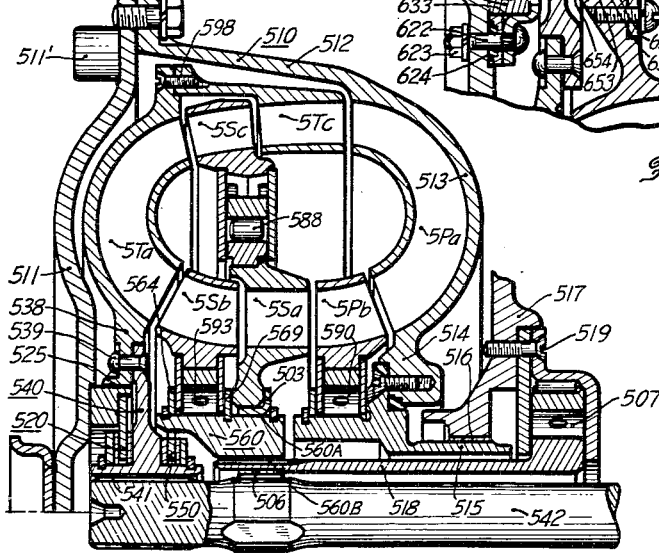
Figure 12 is a radial half-section of a torque converter showing somewhat diagrammatically two turbine members axially situated with a turbine hub, three stator members axially situated with a one-way rotary stator hub, and sliding surface thrust bearings for the turbine and the stator hubs.

Figures 12, 13, and 15 illustrate two constructions of an innovation of this member spacing invention, in which a stator hub is one-way rotatory by virtue of a one-way device included in the reaction structure associating that hub with the exterior support structure. Figure 12 shows somewhat diagrammatically the general arrangement and attachment of members and components of a combination having two stator members in the inner half of the fluid circuit. Figure 13 is enlarged section of the same combination showing the construction details near the axis. Figure 15 is an enlarged section across the axis of a combination having only one inner stator member, and the stator hub integral with that member.

One of the advantages of this one-way rotatory hub innovation is that in the coupling phase the stator hub rotates forwardly, and accordingly, reduces the rotational speed differential between the thrust and the thrust reaction elements of the double-acting thrust bearing which axially locates that stator hub with the turbine hub. Also, for other stator members confined on that stator hub, the respective rubbing velocities therewith are reduced accordingly. This is an important consideration in that, for most torque converter applications, the normal drive and the most prevalent usage is that in the coupling phase.

Another advantage is that it grants more freedom of arrangement of components to attain the most favorable blend of the entire construction; the one-way device serving the final inner stator member may be situated in any location between the stator hub and the exterior support structure. In the two constructions illustrated, that one-way device is situated outside the rotatory casing to grant space therein for a pump member one-way device.

The arrangement shown in Figures 12 and 13 has a rotatory casing and some of the members arranged in a fluid circuit somewhat as illustrated in, and described for, Figure 1; but in many respects the arrangement is distinctly different. A sprag type one-way device 507 is interposed in the reaction structure to permit forward but to prevent backward rotation of reaction shaft 518. This particular construction is shown diagrammatically: the drum of the one-way device 507 is integral with the reaction shaft; and the outer ring is pinned to a flanged cup which is fixed to the external support structure 517 by screws 519. This one-way device must have relatively high torque capacity; it is subjected to the total reaction torque developed by all of the stator members, which is quite high for the operation near stall. As has been explained, the sprag type device disclosed in this specification has much greater torque capacity than the roller type; so, the sprag type is superior for this usage.

The front end of the reaction shaft 518 has a splined connection 560B with the stator hub 560, effecting rotational unity therewith, but maintaining axial freedom. For radial support, this front end of the reaction shaft has a radial bearing association 506 with the torque converter output shaft 542. Relative to the turbine hub 540, the output shaft 542 has a splined connection 541, effecting rotational unity, and radially supporting the shaft, but maintaining axial freedom.

The turbine hub 540 is axially located with the front end cover 511 of the rotatory casing 510 by a double-acting thrust bearing construction 520. The mooring component of that construction is the support ring 521 centered with, and abutted against an inside surface of, the front end cover 511. The annular thrust reaction disc 526 is axially fixed against the back side of the support ring, and the support ring is axially fixed against the front end cover surface, by a plurality of circumferentially spaced screws 522; each of the screws passing through those parts, and having an encircling seal 524, and an external fastening nut 523.

The thrust reaction disc 526 is situated with the opposite sides thereof in thrust bearing associations: the back side, with an annular thrust surface 543 of the front side of the turbine hub; and, the front side, with the back side of an annular thrust disc 536, which is axially retained on the turbine hub by the hub ring groove 544, and a snap ring 545 therein abutting the front side of the thrust disc—in the thrust bearing associations illustrated, thrust bearing washers 537' and 537 are respectively interposed.

Turbine member 5Ta is attached to the turbine hub 540 by a plurality of rivets 539 through a flange of that hub and a shell shroud extension 538. That shell shroud extension also has a rimmed portion in radial bearing association 525 with the mooring component 521. Turbine member 5Tc is fixed with turbine member 5Ta by a plurality of screws 598 fastening respective shell shroud extensions of those members together.

The stator hub 560 is axially located with the turbine hub 540 by a sliding surface double-acting thrust bearing construction 550 which is the same as that illustrated in, and described for, Figures 1 and 2. The form of the front end flanging disc 564, and the retention thereof to the stator hub, is also the same, being as shown in Figure 3.

Stator member 5Sb is shown with a sprag type one-way device 593 attached to the shell shroud of that member, the arrangement having: two annular guide discs 595; a sprag support ring; a plurality of pins 594 to key the support ring with the shell shroud, and to retain the guide discs therewith; and, a plurality of sprags, somewhat as shown in Figures 9 and 10, but arrayed around and between the stator hub cylindrical outer surface 560A and a concentric inner surface of the support ring. Stator member 5Sb is axially situated with the stator hub 560 by the axial confinement of the sprag guide discs 595 between the back side of flanging disc 564, and the front side of a snap-on flanging disc 569 of the type shown in Figure 5, and situated in stator hub ring groove 567''.

Figure 14:
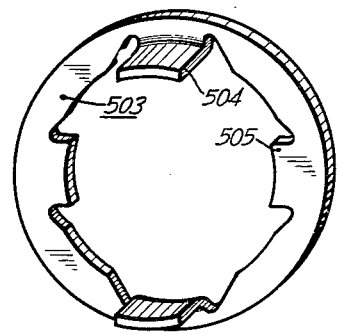
Figure 14 is an oblique view of a disc shown in Figure 13 as one convenient means of rotationally keying and axially retaining the final stator member with the back end of the stator hub.

Stator member 5Sa is the final stator member in the inner half of the fluid circuit in the normal direction of fluid circulation, and is rotationally united with the stator hub 560. Obviously, rotational unity may be effected with a conventional flange and screw connection; but, in the construction illustrated, stator member 5Sa is keyed to, and retained with, the stator hub by a special flanging disc 503 shown obliquely in Figure 14. That disc has a plurality of spokes 505 which extend into radial slots of the stator hub, and key the disc thereto; and, a plurality of axial tangs 504 set in mating slots across the bore surface of a shell shroud element integral with stator member 5Sa, keying that member with the disc. Stator member 5Sa is axially situated with the stator hub 560 by axial confinement of the opposite sides of the shell shroud element thereof between the back side of flanging disc 569 and the front side of flanging disc 503, the latter disc being axially retained with the stator hub by a snap ring 568 abutting the back side of that disc, and situated in stator hub ring groove 567'.

Stator member 5Sc is also axially situated with stator hub 560. The one-way device construction 588 interposed between the core shrouds of stator members 5Sc and 5Sa, axially locates, radially supports, and permits forward but prevents backward rotation of, stator member 5Sc relative to stator member 5Sa.

Two pump members 5Pa and 5Pb are shown in Figures 12 and 13, axially situated with the back portion of the rotatory casing 510, the principal pump member 5Pa being integral therewith. The one-way device construction 590, axially locates, radially supports, and permits forward but prevents backward rotation of, pump member 5Pb relative to pump member 5Pa.

The construction of the one-way rotatory stator hub innovation illustrated in Figure 15 differs somewhat from that shown in Figures 12 and 13. Stator member 6Sa is the only stator member situated in the inner half of the fluid circuit, and the stator hub 660 is integral with the shell shroud of that member. The reaction shaft 618 is formed with a flange 608 which is fixed axially and rotationally to the stator hub by a plurality of screws 609. The back end of that reaction shaft has a splined connection 618' with the drum of one-way device 607, effecting rotational unity with that drum but maintaining axial freedom. Otherwise, the construction of that one-way device 607 is the same as that of device 507 described for Figures 12 and 13; it permits forward but prevents backward rotation of the reaction shaft 618, the stator hub 660, and stator member 6Sa integral with that hub.

The turbine hub 640 is axially located, and radially supported, relative to the front end cover 611 of the rotatory casing 610, by a ball type double-acting thrust bearing construction. The ball bearing component thereof, comprises: an inner ball race 634, which being situated with the turbine hub, is a thrust element, a concentric outer ball race 632 which is situated with the front end cover, and hence is a thrust reaction element; and, a plurality of balls 631 circumferentially spaced between the races.

The inner ball race 634 is centered on the turbine hub circular mounting 635; and, is axially fixed with the turbine hub 640 between the front side abutment 643 of that hub, and a snap ring 645 situated in the turbine hub ring groove 644.

The outer ball race 632 is centered in a circular mounting 633 of the mooring component which, as shown, consists of a support ring 621 and a flanged retainer disc 626 welded together; and, that race is axially fixed between an inside surface of the front end cover 611 and a flange of the retainer disc. The support ring 621 is centered with the front end cover 611; and, that ring and the flanged retainer disc 626 together are axially fixed against an inside surface of the front end cover by a plurality of screws 622, each of which has an intermediate seal 624 and an external fastening nut 623.

A ball type double-acting thrust bearing construction is also illustrated for axially locating, and radially supporting, the stator hub 660 with the turbine hub 640. The ball bearing thereof comprises: an outer ball race 652 which is a thrust element, in that it is mounted with the stator hub in a circular pilot 653 thereof, and is axially fixed with the stator hub between the abutment 654 thereof and the front side of the reaction shaft flange 608; a concentric inner ball race 655 which, being situated with the turbine hub, is a thrust reaction element; and, a plurality of balls 651 circumferentially spaced between the races. The inner ball race 655 is centered on the turbine hub circular mounting 656, and is axially fixed with the turbine hub 640 between the back side abutment 646 of that hub and a snap ring 648 situated in the turbine hub ring groove 647.

The remainder of the construction is mostly that of the pump members 6Pa and 6Pb, and is similar to that described for Figures 12 and 13.

Fig. 16 illustrates a combination of elements and features which are shown in Figs. 6 and 13 and have been described. In Fig. 16, the principal modification from the construction shown in Fig. 6 is the replacement of the particular stator hub and reaction structure by the one-way stator hub arrangement illustrated in Fig. 13. This is, the elements and features of the stator hub arrangement in Fig. 16 are the same as illustrated in Fig. 13 and are designated by the same reference numbers. The remaining elements and features, except for minor adaptations, are the same and have the same reference numbers as those shown in Fig. 6, the minor adaptations being: for output shaft 242, a journal for radial bearing association 506, that shaft in Fig. 16 being designated by 242'; and, for stator members 2Sa and 2Sb, modifications of the shell shroud elements to fit the features of the stator retentive means shown in Fig. 13, the reference numbers of those stator members in Fig. 16 being 2Sa' and 2Sb', respectively.

Fig. 17 illustrates a combination of elements and features which are shown in Figs. 8 and 13 and have been described. In Fig. 17, the principal modification from the construction shown in Fig. 8 is the replacement of the particular stator hub and reaction structure by the one-way stator hub arrangement illustrated in Fig. 13. In Fig. 17, the front end of the stator hub is slightly modified from that in Fig. 13 so as to house and afford an abutting front surface 354 for stator hub bearing race 355, in consideration of which, the reference numbers of the stator hub 560, the annular wall 561 and the front end cavity 562 in Fig. 13 are respectively changed to 560', 561' and 562' in Fig. 17. Also, the reaction shaft is somewhat shorter in Fig. 17 and is designated by 518' instead of 518. Otherwise, the elements and features of the stator hub arrangement in Fig. 17 are the same as illustrated in Fig. 13 and are designated by the same reference numbers. The stator shell shroud elements are modified to fit the features of the stator retentive means shown in Fig. 13, the reference numbers of the stator members 3S*a* and 3S*b* in Fig. 8 being accordingly changed to 3S*a*' and 3S*b*', respectively, in Fig. 17. The remaining elements and features in Fig. 17 are the same and have the same reference numbers as those shown in Fig. 8.

In the embodiments which have been illustrated and described, various forms of components and attachments have been disclosed for the basic member spacing combination of this specification as structural means to perform the principal separate functions: to axially locate a turbine hub relative to a rotatory casing; to axially situate one or more turbine members relative to a turbine hub; to axially locate a stator hub relative to a rotatory turbine hub; and, to axially situate one or more stator members relative to a stator hub. These various forms of components and attachments may be combined into the particular construction which is most suitable for the particular requirements.

Many of the particular structural details are intended to be diagrammatic or symbolic of many other known arrangements. For instance, in lieu of the ring groove and snap ring construction, generally shown as a convenient means of retention, arrangements such as, a plate attached with screws, or a threaded ring nut may be used. Instead of locating a thrust element with the front end of the stator hub by abutment, or by connection, with the front end flanging disc, the thrust element may be fastened to the stator hub, or may be retained to the stator hub, by a snap ring in an internal ring groove. One of the flanging discs, used to retain stator members with the stator hub, may be an integral flange with the hub.

There are various details shown which may be properly omitted for particular usage. In each of the thrust bearing associations of the sliding surface double-acting thrust bearings illustrated, an interposed thrust bearing washer is shown, but is not necessarily required for all applications. The seals shown around the mooring component spindle or fastening screws may be omitted when the rotatory casing is operated in a wet sump.

Prefatory to the detailed descriptions of the appended illustrations, it was divulged fundamentally and explained fully that, in a hydrodynamic torque converter having a rotatory casing, a superior combination has been created by compliance with the following principles and physical arrangements: the axial thrusts of all of the members should be balanced and confined within the rotatory casing, so that each of the members which is rotatory relative to the rotatory casing is maintained axially independent of external association other than that associated with the rotatory casing; most, and preferably all, of the stator members should be axially situated relative to a common component, herein termed the stator hub, thereby axially spacing those stator members relative to each other, and merging their respective thrusts together; most, and preferably all, of the turbine members should be axially situated relative to a common component, herein termed the turbine hub, thereby axially spacing those turbine members with each other, and merging their respective thrusts together; the stator hub should be axially located relative to the turbine hub, thereby maintaining in axial spaced relationship with each other, the stator and the turbine members which are respectively situated axially with those hubs, and transmitting the merged thrusts of the stator members to the turbine hub, which normally rotates slower than the pump member structure; the turbine hub should be axially located relative to the rotatory casing, thereby maintaining the turbine and the stator members axially spaced relative to the rotatory casing, and to the pump member or members axially situated with the rotatory casing; and, the arrangement of the construction should afford convenient assembly of the members and their attachments into a complete torque converter, which as an intact component for a power train, may be easily, attached to a power source, and connected with a supplementary transmission.

The construction of the basic member spacing combination of this specification complies with all of the principles and physical arrangements stated in the preceding paragraph, and has been illustrated and described with a variety of components. Also, the combination has been shown to be quite versatile in being conveniently applicable to a very wide range of torque converter combinations of members.

So far as I am aware, I am the first to conceive of, or to devise, or to construct, this member spacing combination in a hydrodynamic torque converter; hence, I claim this invention generically with essential structural definition to properly characterize it, and with supplementary claims further defining form, structure, and/or features.

It is, of course, understood that the present invention is not limited to the particular forms and structures shown in the drawings, or otherwise revealed, for disclosure and explanatory purposes, but also embraces modifications within the scope of the appended claims.

I claim:

1. In a hydrodynamic torque converter having a stationary support structure and having pump, stator, and turbine bladed members co-axially centered with an output power shaft and arranged in a toroidal fluid circuit within a rotatory casing, the combination comprising: a casing front end cover which is an end element of said rotatory casing; a turbine hub, and turbine retentive means to keep a said turbine member axially situated in both axial directions relative to said turbine hub; a turbine hub double-acting thrust bearing arranged between said turbine hub and said casing front end cover to maintain said turbine hub axially located with said cover in both axial directions and to permit forward rotation of said cover relative to said turbine hub; a stator hub, and stator retentive means to keep a said stator member axially situated in both axial directions relative to said stator hub; a stator hub double-acting thrust bearing arranged between a back side portion of said turbine hub and a circumjacent portion of said stator hub to maintain said stator hub axially located with respect to said turbine hub in both axial directions and to permit forward rotation of said turbine hub relative to said stator hub; stator hub connective means for so relating said stator hub with said stationary support structure to therewith permit axial relative movement and to prevent backward rotation of said stator hub; and, turbine hub connective means for effecting a drive relationship between said turbine hub and said output power shaft which rotationally fixes said turbine hub with said output power shaft and permits axial movement therebetween.

2. The combination defined in claim 1 in a torque converter having a plurality of turbine members and in which said turbine retentive means includes means to keep each one of a plurality of turbine members axially situated in both axial directions relative to said turbine hub.

3. The combination defined in claim 1 in a torque converter having a plurality of stator members and in which said stator retentive means includes means to keep each one of a plurality of stator members axially situated in both axial directions relative to said stator hub.

4. The combination defined in claim 1 in a torque converter having a plurality of turbine members and a plurality of stator members, and in which: said turbine retentive means includes means to keep each one of a plurality of turbine members axially situated in both axial directions relative to said turbine hub; and, said stator retentive means includes means to keep each one of a plurality of stator members axially situated in both axial directions relative to said stator hub.

5. The combination defined in claim 1 in which said stator hub connective means includes a one-way rotatory device arranged therewith to permit forward rotation and to prevent backward rotation of said stator hub.

6. In a hydrodynamic torque converter having a stationary support structure and having pump, stator, and turbine bladed members co-axially centered with an output power shaft and arranged in a toroidal fluid circuit within a rotatory casing, the combination comprising: a turbine hub, and turbine retentive means to keep a said turbine member axially situated in both axial directions relative to said turbine hub; a stator hub, and stator retentive means to keep a said stator member axially situated in both axial directions relative to said stator hub; a stator hub double-acting thrust bearing arranged between a back side portion of said turbine hub and a circumjacent portion of said stator hub to maintain said stator hub axially located with respect to said turbine hub in both axial directions and to permit forward rotation of said turbine hub relative to said stator hub; stator hub connective means for so relating said stator hub with said stationary support structure to therewith permit axial relative movement and to prevent backward rotation of said stator hub; and, turbine hub connective means for effecting a drive relationship between said turbine hub and said output power shaft which rotationally fixes said turbine hub with said output power shaft and permits axial movement therebetween.

7. The combination defined in claim 6 in which said stator hub connective means includes a one-way rotatory device arranged therewith to permit forward rotation and to prevent backward rotation of said stator hub.

8. In a hydrodynamic torque converter having a stationary support structure and having pump, stator, and turbine bladed members co-axially centered with an output power shaft and arranged in a toroidal fluid circuit within a rotatory casing, the combination comprising: a casing front end cover which is an end element of said rotatory casing; a turbine hub, and turbine retentive means to keep a said turbine member axially situated in both axial directions relative to said turbine hub; a turbine hub double-acting thrust bearing and a one-way rotatory device arranged between said turbine hub and said casing front end cover to maintain said turbine hub axially located with said cover in both axial directions, to permit forward rotation of said cover relative to said turbine hub, and to prevent forward rotation of said turbine hub relative to said cover; a stator hub, and stator retentive means to keep a said stator member axially situated in both axial directions relative to said stator hub; a stator hub double-acting thrust bearing arranged between a back side portion of said turbine hub and a circumjacent portion of said stator hub to maintain said stator hub axially located with respect to said turbine hub in both axial directions and to permit forward rotation of said turbine hub relative to said stator hub; stator hub connective means for so relating said stator hub with said stationary support structure to therewith permit axial relative movement and to prevent backward rotation of said stator hub; and, turbine hub connective means for effecting a drive relationship between said turbine hub and said output power shaft which rotationally fixes said turbine hub with said output power shaft and permits axial movement therebetween.

9. In a hydrodynamic torque converter having a stationary support structure and having pump, stator, and turbine bladed members co-axially centered with an output power shaft and arranged in a toroidal fluid circuit within a rotary casing, the combination comprising: a casing front end cover which is an end element of said rotary casing; a turbine hub, and turbine retentive means to keep a said turbine member axially situated in both axial directions relative to said turbine hub; a turbine hub double-acting thrust bearing and a one-way rotatory device arranged between said turbine hub and said casing front end cover to maintain said turbine hub axially located with said cover in both axial directions, to permit forward rotation of said cover relative to said turbine hub, and to prevent forward rotation of said turbine hub relative to said cover; and, turbine hub connective means for effecting a drive relationship between said turbine hub and said output power shaft which rotationally fixes said turbine hub with said output power shaft and permits axial movement therebetween.

10. In a hydrodynamic torque converter having a stationary support structure and having pump, stator, and turbine bladed members co-axially centered with an output power shaft and arranged in a toroidal fluid circuit within a rotary casing, the combination comprising: a casing front end cover which is an end element of said rotatory casing; a turbine hub, and turbine retentive means to keep a said turbine member axially situated in both axial directions relative to said turbine hub; a turbine hub double-acting thrust bearing arranged between said turbine hub and said casing front end cover to maintain said turbine hub axially located with said cover in both axial directions and to permit forward rotation of said cover relative to said turbine hub; a stator hub, and stator retentive means to keep a said stator member axially situated in both axial directions relative to said stator hub; a stator hub double-acting thrust bearing arranged between a back side portion of said turbine hub and a circumjacent portion of said stator hub, said stator hub bearing being a sliding-surface construction including a stator hub thrust element having two axially-spaced and oppositely-disposed thrust surfaces of annular form in axially fixed relation with said stator hub, and a stator hub thrust reaction disc of annular form axially spaced from a back side surface of said turbine hub and therewith axially retained and so arranged in thrust bearing associations with said two oppositely disposed thrust surfaces to maintain said stator hub axially located in both axial directions relative to said turbine hub and to permit forward rotation of said turbine hub relative to said stator hub; stator hub connective means for so relating said stator hub with said stationary support structure to therewith permit axial relative movement and to prevent backward rotation of said stator hub; and, turbine hub connective means for effecting a drive relationship between said turbine hub and said output power shaft which rotationally fixes said turbine hub with said output power shaft and permits axial movement therebetween.

11. The combination defined in claim 10 in which said turbine hub bearing is a sliding-surface construction and includes: a turbine hub thrust reaction means having two axially-spaced and oppositely-disposed thrust reaction surfaces of annular form in axially fixed relation with said casing front end cover; and a turbine hub thrust means including a front side surface of said turbine hub in thrust bearing association with one of said two thrust reaction surfaces, and an annular thrust element axially retained with said turbine hub and situated with a side surface of said thrust element in thrust bearing association with the other one of said two thrust reaction surfaces.

12. The combination defined in claim 10 in which said stator hub connective means includes a one-way rotatory device arranged therewith to permit forward rotation and to prevent backward rotation of said stator hub.

13. The combination defined in claim 10 in which: said stator hub includes at its front end an axially-protruding annular wall around an axially recessed cavity, and a plurality of radial slots across said annular wall; and, said stator retentive means includes two axially-spaced flanging elements around said stator hub, and means for maintaining each one of said two flanging elements axially retained with said stator hub, one of said two flanging elements being a front flanging element and having a plurality of spoke elements situated in said stator hub slots.

14. The combination defined in claim 13 in which said stator hub thrust element and said front flanging element including said spokes thereof are structurally unitary, said spokes being intermediary integral elements.

15. In a hydrodynamic torque converter having a stationary support structure and having pump, stator, and turbine bladed members co-axially centered with an output power shaft and arranged in a toroidal fluid circuit within a rotatory casing, the combination comprising: a turbine hub, and turbine retentive means to keep a said turbine member axially situated in both axial directions relative to said turbine hub; a stator hub, and stator retentive means to keep a said stator member axially situated in both axial directions relative to said stator hub; a stator hub double-acting thrust bearing arranged between a back side portion of said turbine hub and a circumjacent portion of said stator hub, said stator hub bearing being a sliding-surface construction including a stator hub thrust element having two axially-spaced and oppositely-disposed thrust surfaces of annular form in axially fixed relation with said stator hub, and a stator hub thrust reaction disc of annular form axially spaced from a back side surface of said turbine hub and therewith axially retained and so arranged in thrust bearing associations with said two oppositely-disposed thrust surfaces to maintain said stator hub axially located in both axial directions relative to said turbine hub and to permit forward rotation of said turbine hub relative to said stator hub; stator hub connective means for so relating said stator hub with said stationary support structure to therewith permit axial relative movement and to prevent backward rotation of said stator hub; and, turbine hub connective means for effecting a drive relationship between said turbine hub and said output power shaft which rotationally fixes said turbine hub with said output power shaft and permits axial movement therebetween.

16. The combination defined in claim 15 in which said stator hub connective means includes a one-way rotatory device arranged therewith to permit forward rotation and to prevent backward rotation of said stator hub.

17. The combination defined in claim 15 in which: said stator hub includes at its front end an axially-protruding annular wall around an axially recessed cavity, and a plurality of radial slots across said annular wall; and, said stator retentive means includes two axially-spaced flanging elements around said stator hub, and means for maintaining each one of said two flanging elements axially retained with said stator hub, one of said two flanging elements being a front flanging element and having a plurality of spoke elements situated in said stator hub slots.

18. The combination defined in claim 17 in which said stator hub thrust element and said front flanging element including said spokes thereof are structurally unitary, said spokes being intermediary integral elements.

19. In a hydrodynamic torque converter having a stationary support structure and having pump, stator, and turbine bladed members co-axially centered with an output power shaft arranged in a toroidal fluid circuit within a rotatory casing, the combination comprising: a casing front end cover which is an end element of said rotatory casing; a turbine hub, and turbine retentive means to keep a said turbine member axially situated in both axial directions relative to said turbine hub; a turbine hub double-acting thrust bearing and a roller type one-way rotatory device arranged between said turbine hub and said casing front end cover to maintain said turbine hub axially located with said cover in both axial directions, to permit forward rotation of said cover relative to said turbine hub, and to prevent forward rotation of said turbine hub relative to said cover, said one-way device including a drum formed with a smooth cylindrical outer surface and situated axially retained and rotationally fixed with said turbine hub, a support ring having a plurality of internal cam surfaces situated around said drum outer surface to therewith bound wedge-shape spaces convergent in the peripheral direction of forward rotation, a cylindrical roller situated in each said wedge-shape space, and jam urging means for said rollers, said support ring being rotationally fixed and axially retained with said casing cover; a stator hub, and stator retentive means to keep a said stator member axially situated in both axial directions relative to said stator hub; a stator hub double-acting thrust bearing arranged between a back side portion of said turbine hub and a circumjacent portion of said stator hub to maintain said stator hub axially located with respect to said turbine hub in both axial directions and to permit forward rotation of said turbine hub relative to said stator hub; stator hub connective means for so relating said stator hub with said stationary support structure to therewith permit axial relative movement and to prevent backward rotation of said stator hub; and, turbine hub connective means for effecting a drive relationship between said turbine hub and said output power shaft which rotationally fixes said turbine hub with said output power shaft and permits axial movement therebetween.

20. The combination defined in claim 19 in which said turbine hub bearing is a sliding-surface construction and includes: a turbine hub thrust reaction element axially fixed with said casing front end cover in a spaced relationship having said one-way device support ring interposed between said thrust reaction element and said cover, said thrust reaction element having two axially-spaced and oppositely-disposed thrust reaction surfaces of annular form; and, turbine hub thrust means including a front side surface of said turbine hub and a back side surface of said one-way device drum arranged in thrust bearing associations with said two thrust reaction surfaces.

21. In a hydrodynamic torque converter having a stationary support structure and having pump, stator, and turbine bladed members co-axially centered with an output power shaft and arranged in a toroidal fluid circuit within a rotatory casing, the combination comprising: a casing front end cover which is an end element of said rotatory casing; a turbine hub, and turbine retentive means to keep a said turbine member axially situated in both axial directions relative to said turbine hub; a turbine hub double-acting thrust bearing and a roller type one-way rotatory device arranged between said turbine hub and said casing front end cover to maintain said turbine hub axially located with said cover in both axial directions, to permit forward rotation of said cover relative to said turbine hub, and to prevent forward rotation of said turbine hub relative to said cover, said one-way device including a drum formed with a smooth cylindrical outer surface and situated axially retained and rotationally fixed with said turbine hub, a support ring having a plurality of internal cam surfaces situated around said drum outer surface to therewith bound wedge-shape spaces convergent in the peripheral direction of forward rotation, a cylindrical roller situated in each said wedge-shape space, and jam urging means for said rollers, said support ring being rotationally fixed and axially retained with said casing cover; and, turbine hub connective means for effecting a drive relationship between said turbine hub and said output power shaft which rotationally fixes said turbine hub with said output power shaft and permits axial movement therebetween.

22. The combination defined in claim 21 in which said turbine hub bearing is a sliding-surface construction and includes: a turbine hub thrust reaction element axially fixed with said casing front end cover in a spaced relationship having said one-way device support ring interposed between said thrust reaction element and said cover, said thrust reaction element having two axially-spaced and oppositely-disposed thrust reaction surfaces of annular form; and, turbine hub thrust means including a front side surface of said turbine hub and a back side surface of said one-way device drum arranged in thrust bearing associations with said two thrust reaction surfaces.

23. In a hydrodynamic torque converter having a stationary support structure and having pump, stator, and turbine bladed members co-axially centered with an output power shaft and arranged in a toroidal fluid circuit within a rotatory casing, the combination comprising: a casing front end cover which is an end element of said rotatory casing; a turbine hub, and turbine retentive means to keep a said turbine member axially situated in both axial directions relative to said turbine hub; a turbine hub double-acting thrust bearing arranged between said turbine hub and said casing front end cover to maintain said turbine hub axially located with said cover in both axial directions and to permit forward rotation of said cover relative to said turbine hub; a stator hub, and stator retentive means to keep a said stator member axially situated in both axial directions relative to said stator hub; a stator hub double-acting thrust bearing arranged between a back side portion of said turbine hub and a circumjacent portion of said stator hub, said stator hub bearing being a construction including a ball type bearing having two concentric races and an intermediary series of balls operative to keep said races axially located with each other in both axial directions and to permit relative rotation, means associated with said turbine hub to retain axially fixed therewith one of said two races, and stator hub race-retentive means associated with said stator hub to retain axially fixed therewith the other one of said two races, said stator hub bearing thus being operative to maintain said stator hub axially located in both axial directions relative to said turbine hub and to permit forward rotation of said turbine hub relative to said stator hub; stator hub connective means for so relating said stator hub with said stationary support structure to therewith permit axial relative movement and to prevent backward rotation of said stator hub; and, turbine hub connective means for effecting a drive relationship between said turbine hub and said output power shaft which rotationally fixes said turbine hub with said output power shaft and permits axial movement therebetween.

24. The combination defined in claim 23, in which the construction of said turbine hub bearing includes: a bell type bearing having two concentric races and an intermediary series of balls operative to keep said races axially located with each other in both axial directions and to permit relative rotation; means associated with said turbine hub to retain axially fixed therewith one of said two races of said turbine hub bearing; and, race retentive means associated with said casing cover to retain axially fixed therewith the other one of said two races of said turbine hub bearing.

25. The combination defined in claim 23 in which said stator hub connective means includes a one-way rotatory device arranged therewith to permit forward rotation and to prevent backward rotation of said stator hub.

26. The combination defined in claim 23 in which: said stator hub includes at its front end an axially-protruding annular wall around an axially recessed cavity, and a plurality of radial slots across said annular wall; and, said stator retentive means includes two axially-spaced flanging elements around said stator hub, and means for maintaining each one of said two flanging elements axially retained with said stator hub, one of said two flanging elements being a front flanging element and having a plurality of spoke elements situated in said stator hub slots.

27. The combination defined in claim 26 in which: a plurality of said spokes of said front flanging element radially protrude into said stator hub cavity; and, said stator hub race-retentive means includes in said stator hub cavity a recessed front surface of said stator hub, said recessed front surface being axially spaced from the back sides of said spokes to form therewith oppositely-disposed race-retentive surfaces.

28. In a hydrodynamic torque converter having a stationary support structure and having pump, stator, and turbine bladed members co-axially centered with an output power shaft and arranged in a toroidal fluid circuit within a rotatory casing, the combination comprising: a turbine hub, and turbine retentive means to keep a said turbine member axially situated in both axial directions relative to said turbine hub; a stator hub, and stator retentive means to keep a said stator member axially situated in both axial directions relative to said stator hub; a stator hub double-acting thrust bearing arranged between a back side portion of said turbine hub and a circumjacent portion of said stator hub, said stator hub bearing being a construction including a ball type bearing having two concentric races and an intermediary series of balls operative to keep said races axially located with each other in both axial directions and to permit relative rotation, means associated with said turbine hub to retain axially fixed therewith one of said two races, and stator hub race-retentive means associated with said stator hub to retain axially fixed therewith the other one of said two races, said stator hub bearing thus being operative to maintain said stator hub axially located in both axial directions relative to said turbine hub and to permit forward rotation of said turbine hub relative to said stator hub; stator hub connective means for so relating said stator hub with said stationary support structure to therewith permit axial relative movement and to prevent backward rotation of said stator hub; and, turbine hub connective means for effecting a drive relationship between said turbine hub and said output power shaft which rotationally fixes said turbine hub with said output power shaft and permits axial movement therebetween.

29. The combination defined in claim 28 in which said stator hub connective means includes a one-way rotatory device arranged therewith to permit forward rotation and to prevent backward rotation of said stator hub.

30. The combination defined in claim 28 in which: said stator hub includes at its front end an axially-protruding annular wall around an axially recessed cavity, and a plurality of radial slots across said annular wall; and, said stator retentive means includes two axially-spaced flanging elements around said stator hub, and means for maintaining each one of said two flanging elements axially retained with said stator hub, one of said two flanging elements being a front flanging element and having a plurality of spoke elements situated in said stator hub slots.

31. The combination defined in claim 30 in which: a plurality of said spokes of said front flanging element radially protrude into said stator hub cavity; and, said stator hub race-retentive means includes in said stator hub cavity a recessed front surface of said stator hub, said recessed front surface being axially spaced from the back sides of said spokes to form therewith oppositely-disposed race-retentive surfaces.

32. In a hydrodynamic torque converter having a stationary support structure and having pump, stator, and turbine bladed members co-axially centered with an output power shaft and arranged in a toroidal fluid circuit within a rotatory casing, the combination comprising: a casing front end cover which is an end element of said rotatory casing; a turbine hub, and turbine retentive means to keep a said turbine member axially situated in both axial directions relative to said turbine hub; a turbine hub double-acting thrust bearing and a sprag type one-way rotatory device arranged between said turbine hub and said casing front end cover to maintain said turbine hub axially located with said cover in both axial directions, to permit forward rotation of said cover relative to said turbine hub, and to prevent forward rotation of said turbine hub relative to said cover, said one-way device including a drum formed with a smooth cylindrical outer surface and situated axially retained and rotationally fixed with said turbine hub, a support ring having a smooth cylindrical inner surface disposed around said drum outer surface to bound an annular space therebetween, a plurality of one-way jamming sprags arranged around said annular space for one-way jamming to prevent forward rotation of said drum relative to said support ring, jam urging means for said sprags, and means to keep said support ring rotationally fixed and axially retained with said casing cover; a stator hub, and stator retentive means to keep a said stator member axially situated in both axial directions relative to said stator hub; a stator hub double-acting thrust bearing arranged between a back side portion of said turbine hub and a circumjacent portion of said stator hub to maintain said stator hub axially located with respect to said turbine hub in both axial directions and to permit forward rotation of said turbine hub relative to said stator hub; stator hub connective means for so relating said stator hub with said stationary support structure to therewith permit axial relative movement and to prevent backward rotation of said stator hub; and, turbine hub connective means for effecting a drive relationship between said turbine hub and said output power shaft which rotationally fixes said turbine hub with said output power shaft and permits axial movement therebetween.

33. The combination defined in claim 32 in which the construction of said turbine hub bearing includes: a ball type bearing having an inner race and an outer race concentric with each other, and an intermediary series of balls operative to maintain said inner and outer races axially located with each other in both axial directions and to permit relative rotation; axial confinement of said inner race between a front side shoulder of said turbine hub and a back side surface of said one-way device drum to retain said inner race axially fixed with said turbine hub; and, means associated with said one-way device support ring to maintain said outer race axially fixed in spaced relationship with said casing cover.

34. The combination defined in claim 32 in which said jam urging means includes: a compression type urging spring of coil form disposed between two adjacent sprags of said plurality of sprags to urge the outer end of one of said two adjacent sprags and the inner end of the other in opposite circumferential directions to induce prompt jamming action, said spring being disposed with its coil axis oblique from tangency with an imaginary circle which is concentric with said drum and intersects said spring coil axis midway between the opposite end coils of said spring; and each one of said two adjacent sprags having a spring seat disposed with normal squareness relative to said oblique disposition of said spring coil axis and supporting a respective one of said spring opposite end coils.

35. The combination defined in claim 34 in which said jam urging means includes a said urging spring disposed between each two adjacent sprags of said plurality of sprags, and each one of said plurality of sprags having two of said spring seats situated one to the other on opposite sides and radially offset so that spring thrusts exerted in said two seats of each sprag cooperate to urge prompt jamming action.

36. In a hydrodynamic torque converter having a stationary support structure and having pump, stator, and turbine bladed members co-axially centered with an output power shaft and arranged in a toroidal fluid circuit within a rotatory casing, the combination comprising: a casing front end cover which is an end element of said rotatory casing; a turbine hub, and turbine retentive means to keep a said turbine member axially situated in both axial directions relative to said turbine hub; a turbine hub double-acting thrust bearing and a sprag type one-way rotatory device arranged between said turbine hub and said casing front end cover to maintain said turbine hub axially located with said cover in both axial directions, to permit forward rotation of said cover relative to said turbine hub, and to prevent forward rotation of said turbine hub relative to said cover, said one-way device including a drum formed with a smooth cylindrical outer surface and situated axially retained and rotationally fixed with said turbine hub, a support ring having a smooth cylindrical inner surface disposed around said drum outer surface to bound an annular space therebetween, a plurality of one-way jamming sprags arranged around said annular space for one-way jamming to prevent forward rotation of said drum relative to said support ring, jam urging means for said sprags, and means to keep said support ring rotationally fixed and axially retained with said casing cover; and, turbine hub connective means for effecting a drive relationship between said turbine hub and said output power shaft which rotationally fixes said turbine hub with said output power shaft and permits axial movement therebetween.

37. The combination defined in claim 36 in which the construction of said turbine hub bearing includes: a ball type bearing having an inner race and an outer race concentric with each other, and an intermediary series of balls operative to maintain said inner and outer races axially located with each other in both axial directions and to permit relative rotation; axial confinement of said inner race between a front side shoulder of said turbine hub and a back side surface of said one-way device drum to retain said inner race axially fixed with said turbine hub; and, means associated with said one-way device support ring to maintain said outer race axially fixed in spaced relationship with said casing cover.

38. The combination defined in claim 36 in which said jam urging means includes: a compression type urging spring of coil form disposed between two adjacent sprags of said plurality of sprags to urge the outer end of one of said two adjacent sprags and the inner end of the other in opposite circumferential directions to induce prompt jamming action, said spring being disposed with its coil axis oblique from tangency with an imaginary circle which is concentric with said drum and intersects said spring coil axis midway between the opposite end coils of said spring; and, each one of said two adjacent sprags having a spring seat disposed with normal squareness relative to said oblique disposition of said spring coil axis and supporting a respective one of said spring opposite end coils.

39. The combination defined in claim 38 in which said jam urging means includes a said urging spring disposed between each two adjacent sprags of said plurality of sprags, and each one of said plurality of sprags having two of said spring seats situated one to the other on opposite sides and radially offset so that spring thrusts exerted in said two seats of each sprag cooperate to urge prompt jamming action.

40. In a hydrodynamic torque converter having a stationary support structure and having pump, stator, and turbine bladed members co-axially centered with an output power shaft and arranged in a toroidal fluid circuit within a rotatory casing, the combination comprising: a casing front end cover which is an end element of said rotatory casing; a turbine hub, and turbine retentive means to keep a said turbine member axially situated in both axial directions relative to said turbine hub; a turbine hub double-acting thrust bearing arranged between said turbine hub and said casing front end cover to maintain said turbine hub axially located with said cover in both axial directions and to permit forward rotation of said cover relative to said turbine hub; a stator hub having a said stator member fully fixed therewith; a stator hub double-acting thrust bearing arranged between a back side portion of said turbine hub and a circumjacent portion of said stator hub to maintain said stator hub axially located with respect to said turbine hub in both axial directions and to permit forward rotation of said turbine hub relative to said stator hub; stator hub connective means for so relating said stator hub with said stationary support structure to therewith permit axial relative movement and to prevent backward rotation of said stator hub, said stator hub connective means including a one-way device arranged therewith to permit forward rotation of said stator hub; and, turbine hub connective means for effecting a drive relationship between said turbine hub and said output power shaft which rotationally fixes said turbine hub with said output power shaft and permits axial movement therebetween.

41. In a hydrodynamic torque converter having a stationary support structure and having pump, stator, and turbine bladed members co-axially centered with an output power shaft and arranged in a toroidal fluid circuit within a rotatory casing, the combination comprising: a turbine hub, and turbine retentive means to keep a said turbine member axially situated in both axial directions relative to said turbine hub; a stator hub having a said stator member fully fixed therewith; a stator hub double-acting thrust bearing arranged between a back side portion of said turbine hub and a circumjacent portion of said stator hub to maintain said stator hub axially located with respect to said turbine hub in both axial directions and to permit forward rotation of said turbine hub relative to said stator hub; stator hub connective means for so relating said stator hub with said stationary support structure to therewith permit axial relative movement and to prevent backward rotation of said stator hub, said stator hub connective means including a one-way device arranged therewith to permit forward rotation of said stator hub; and, turbine hub connective means for effecting a drive relationship between said turbine hub and said output power shaft which rotationally fixes said turbine hub with said output power shaft and permits axial movement therebetween.

References Cited in the file of this patent
UNITED STATES PATENTS

| | | |
|---|---|---|
| 2,043,790 | Baker | June 9, 1936 |
| 2,293,767 | Salerni | Aug. 25, 1942 |
| 2,325,404 | Irons | July 27, 1943 |
| 2,388,424 | Lund | Nov. 6, 1945 |
| 2,428,962 | Davis | Oct. 14, 1947 |
| 2,457,692 | La Brie | Dec. 28, 1948 |
| 2,609,706 | Jandasek | Sept. 9, 1952 |
| 2,612,754 | Swift | Oct. 7, 1952 |
| 2,651,918 | Kelley et al. | Sept. 15, 1953 |
| 2,717,673 | Zeidler | Sept. 13, 1955 |